US009942864B2

(12) United States Patent
Kravets et al.

(10) Patent No.: US 9,942,864 B2
(45) Date of Patent: Apr. 10, 2018

(54) LOCATING THE SOURCE OF A WIRELESS SIGNAL

(71) Applicant: Cognitive Systems Corp., Waterloo (CA)

(72) Inventors: Oleksiy Kravets, Petersburg (CA); Colin John Sherrat, Waterloo (CA)

(73) Assignee: Cognitive Systems Corp., Waterloo, Ontario (CA)

( * ) Notice: Subject to any disclaimer, the term of this patent is extended or adjusted under 35 U.S.C. 154(b) by 0 days.

(21) Appl. No.: 15/359,530

(22) Filed: Nov. 22, 2016

(65) Prior Publication Data
US 2017/0078989 A1 Mar. 16, 2017

Related U.S. Application Data

(62) Division of application No. 14/613,912, filed on Feb. 4, 2015, now Pat. No. 9,535,155.

(51) Int. Cl.
*H04W 64/00* (2009.01)
*H04W 56/00* (2009.01)
(Continued)

(52) U.S. Cl.
CPC .............. *H04W 56/001* (2013.01); *G01S 5/02* (2013.01); *G01S 5/04* (2013.01); *G01S 5/06* (2013.01);
(Continued)

(58) Field of Classification Search
CPC .......... G01S 19/48; G01S 5/0289; G01S 5/06; H04W 24/00; H04W 64/00; H04W 84/18;
(Continued)

(56) References Cited

U.S. PATENT DOCUMENTS

| 6,046,682 A | 4/2000 | Zimmerman et al. |
| 6,564,065 B1 | 5/2003 | Chang et al. |

(Continued)

FOREIGN PATENT DOCUMENTS

| CA | 2192248 | 6/1997 |
| EP | 0863638 | 9/1998 |

(Continued)

OTHER PUBLICATIONS

USPTO, Notice of Allowance issued in U.S. Appl. No. 14/668,549 dated Jun. 21, 2017, 30 pages.
(Continued)

*Primary Examiner* — Quan M Hua
(74) *Attorney, Agent, or Firm* — Henry Patent Law Firm PLLC

(57) ABSTRACT

In some aspects, a wireless-signal source locator system includes wireless sensor devices distributed at distinct locations over a geographic region. The wireless sensor devices are configured to passively monitor wireless communication network signals in the geographic region. Each wireless sensor device is configured to receive a source signal wirelessly transmitted by a source (e.g., a mobile device, etc.) and a reference signal (e.g., from a synchronization source). The wireless sensor devices can generate arrival-time data based on the source signal and the reference signal. The wireless-signal source locator system further includes a data analysis system configured to receive the arrival-time data from the wireless sensor devices and to identify a location of the source based on analyzing the arrival-time data generated by three or more of the wireless sensor devices.

18 Claims, 18 Drawing Sheets

(51) Int. Cl.
| | |
|---|---|
| *G01S 5/04* | (2006.01) |
| *H04W 72/04* | (2009.01) |
| *H04L 12/26* | (2006.01) |
| *H04W 24/00* | (2009.01) |
| *G01S 5/02* | (2010.01) |
| *G01S 5/06* | (2006.01) |
| *G01S 5/14* | (2006.01) |
| *H04W 84/18* | (2009.01) |

(52) U.S. Cl.
CPC ............... *G01S 5/14* (2013.01); *H04L 43/00* (2013.01); *H04W 24/00* (2013.01); *H04W 64/00* (2013.01); *H04W 64/006* (2013.01); *H04W 72/0413* (2013.01); *H04W 84/18* (2013.01)

(58) Field of Classification Search
CPC ............. H04W 56/001; H04W 64/006; H04W 72/0413; H04W 4/021; H04W 4/22; H04W 68/00; H04W 76/007; H04W 24/10; H04W 4/023; H04L 43/00; H04L 67/12; H02J 13/0062; H02J 13/0075
See application file for complete search history.

(56) References Cited

U.S. PATENT DOCUMENTS

| | | | |
|---|---|---|---|
| 6,580,914 B1 | 6/2003 | Smith | |
| 6,816,709 B2 | 11/2004 | Dickey | |
| 6,917,609 B2 | 7/2005 | Dickey | |
| 6,931,235 B2 | 8/2005 | Kline et al. | |
| 6,950,665 B2 | 9/2005 | Swift et al. | |
| 7,013,113 B2 | 3/2006 | Dickey | |
| 7,019,691 B1 | 3/2006 | Soltanian et al. | |
| 7,050,755 B2 | 5/2006 | Kline | |
| 7,180,420 B2 | 2/2007 | Maurer | |
| 7,236,746 B2 | 6/2007 | Peric | |
| 7,272,126 B2 | 9/2007 | Soltanian et al. | |
| 7,295,156 B2 | 11/2007 | Van Wyck Loomis | |
| 7,460,837 B2 | 12/2008 | Diener | |
| 7,466,986 B2 | 12/2008 | Halcrow et al. | |
| 7,610,036 B2 | 10/2009 | Teo et al. | |
| 7,639,985 B2 | 12/2009 | Dickey | |
| 8,350,758 B1 | 1/2013 | Parvizi et al. | |
| 8,422,461 B2 | 4/2013 | Dickey | |
| 8,576,825 B2 | 11/2013 | Wu et al. | |
| 2002/0052208 A1* | 5/2002 | Porcino | G01S 5/12 455/456.6 |
| 2003/0139909 A1 | 7/2003 | Ozawa | |
| 2004/0152471 A1 | 8/2004 | MacDonald | |
| 2005/0108129 A1 | 5/2005 | Seibert et al. | |
| 2005/0286409 A1 | 12/2005 | Yoon et al. | |
| 2006/0083205 A1 | 4/2006 | Buddhikot et al. | |
| 2006/0246911 A1 | 11/2006 | Petermann | |
| 2008/0049700 A1* | 2/2008 | Shah | G01D 21/00 370/342 |
| 2008/0076450 A1 | 3/2008 | Nanda et al. | |
| 2008/0125108 A1 | 5/2008 | Kuo et al. | |
| 2008/0166974 A1 | 7/2008 | Teo et al. | |
| 2008/0231499 A1 | 9/2008 | Kim et al. | |
| 2008/0266050 A1 | 10/2008 | Crouse et al. | |
| 2009/0197550 A1 | 8/2009 | Huttunen et al. | |
| 2009/0201208 A1 | 8/2009 | McPherson et al. | |
| 2009/0280801 A1* | 11/2009 | Malik | G01S 5/0263 455/426.1 |
| 2010/0124886 A1 | 5/2010 | Fordham et al. | |
| 2010/0135263 A1 | 6/2010 | Zakrzewski | |
| 2010/0203837 A1 | 8/2010 | Taniguchi | |
| 2010/0246416 A1 | 9/2010 | Sinha et al. | |
| 2011/0085524 A1 | 4/2011 | Soliman et al. | |
| 2011/0166897 A1 | 7/2011 | Beckman | |
| 2011/0185059 A1 | 7/2011 | Adnani et al. | |
| 2011/0210843 A1 | 9/2011 | Kummetz | |
| 2011/0285589 A1* | 11/2011 | Bull | G01S 5/0242 342/387 |
| 2012/0238218 A1 | 9/2012 | Stine | |
| 2013/0029589 A1 | 1/2013 | Bontu et al. | |
| 2013/0072226 A1 | 3/2013 | Thramann | |
| 2013/0150074 A1 | 6/2013 | Shrestha et al. | |
| 2013/0310093 A1 | 11/2013 | Giannakis et al. | |
| 2014/0063055 A1 | 3/2014 | Osterhout et al. | |
| 2014/0086081 A1 | 3/2014 | Mack et al. | |
| 2014/0162702 A1 | 6/2014 | Crawford et al. | |
| 2014/0168225 A1 | 6/2014 | Ohwaki et al. | |
| 2014/0256328 A1 | 9/2014 | Li | |
| 2014/0274109 A1 | 9/2014 | Venkatraman et al. | |
| 2014/0362711 A1 | 12/2014 | Jiang et al. | |
| 2015/0119014 A1 | 4/2015 | Muraoka et al. | |

FOREIGN PATENT DOCUMENTS

| | | |
|---|---|---|
| WO | 2003/009612 | 1/2003 |
| WO | 2006/135542 | 12/2006 |
| WO | 2010/083606 | 7/2010 |

OTHER PUBLICATIONS

Supplemental Non-Final Office Action received in U.S. Appl. No. 14/668,549, dated Dec. 27, 2016, 20 pages.
SeeGull® EXflex™ Scanning Receiver, PCTEL® RF Solutions, Obtained online at http://rfsolutions.pctel.com/artifacts/10MRK2_11_SeeGull_EXflex_Brochure.pdf on Jul. 17, 2014, 4 pages.
PCTEL; EXflex™ Pay Per Use Metered Licensing System, Feature Highlight, Obtained online at http://rfsolutions.pctel.com/artifacts/Pctel_PPU_FINAL.PDF on Jul. 17, 2014, 1 page.
PCTEL, SeeGull® Scanning Receivers, High Performance Wireless Network Measurement, Obtained online at http://rfsolutions.pctel.com/content.cgi?id_num=683 on Jul. 17, 2014, 8 pages.
Baldock radio monitoring station, obtained online at http://stakeholders.ofcom.org.uk/binaries/enforcement/spectrum-enforcement/baldock.pdf, on Jul. 17, 2014, 13 pages.
PCTEL, SeeHawk® Wireless Drive and Walk Test Suite, obtained online at http://rfsolutions.pctel.com/content.cgi?id_num=1013 on Aug. 20, 2014, 9 pages.
AZQ Android—WCDMA/GSM Drive Test Tool on Android, obtained online at http://www.azenqos.com/ on Aug. 6, 2014, 13 pages.
Buddhikot et al. DIMSUMNet: New Directions in Wireless Networking Using Coordinated Dynamic Spectrum Access, Poroceedings of the Sixth IEEE International Symposium on (WoWMoM '05), 2005 IEEE; 8 pages.
Office Action issued in U.S. Appl. No. 14/334,822 dated Oct. 24, 2014, 17 pages.
Office Action issued in U.S. Appl. No. 14/521,173 dated Dec. 10, 2014, 15 pages.
International Search Report and Written Opinion issued in application PCT/CA2014/000602 dated Mar. 20, 2015, 9 pages.
International Search Report and Written Opinion of the International Searching Authority issued in International Application No. PCT/CA2014/000826 dated Jul. 16, 2015; 8 pages.
Office Action received in U.S. Appl. No. 14/668,549, dated Jun. 10, 2015, 11 pages.
Office Action received in U.S. Appl. No. 14/730,688, dated Jul. 17, 2015, 20 pages.
Office Action issued in U.S. Appl. No. 14/668,549 dated Jan. 4, 2016; 24 pages.
International Search Report and Written Opinion issued in application PCT/CA2015/000197 dated Nov. 5, 2015; 11 pages.
International Search Report and Written Opinion issued in application PCT/CA2015/000349 dated Nov. 30, 2015; 9 pages.
Notice of Allowance and Fees Due for U.S. Appl. No. 14/730,688 dated Jun. 4, 2015; 22 pages.
International Search Report and Written Opinion of the International Searching Authority issued in International Application No. PCT/CA2015/000446 dated Feb. 24, 2016; 10 pages.

(56) References Cited

OTHER PUBLICATIONS

Bengtsson, M., et al., On the Estimation of Azimuth Distributions and Azimuth Spectra, Vehicular Technology Conference, 2001, VTC 2001, IEEE VTS 54th, Atlantic City, NJ, Oct. 7, 2001, vol. 3, pp. 1612-1615.

Tang, et al., Study on Power Azimuth Spectrum of Wireless Channel in Microcell Environments, 14th IEEE 2003 International Symposium on Personal, Indoor and Mobile Radio Proceedings, Sep. 7, 2003, vol. 1, pp. 685-687.

Office Action received in U.S. Appl. No. 14/668,549, dated Jul. 28, 2016, 15 pages.

\* cited by examiner

LOCATING THE SOURCE OF A WIRELESS SIGNAL

CROSS-REFERENCE TO RELATED APPLICATIONS

This application is a divisional of U.S. application Ser. No. 14/613,912, filed on Feb. 4, 2015 and entitled "Locating the Source of a Wireless Signal," which is hereby incorporated by reference.

BACKGROUND

This specification relates to locating a source of a wireless signal, for example, a radio frequency signal.

The Global Positioning System (GPS) is an example of a satellite-based system that provides position, navigation, and timing services for user devices. For example, the GPS system can be accessed by a GPS receiver in a hand-held device, such as a smartphone or a navigation instrument, to determine geographic coordinates of the hand-held device. The GPS receiver can obtain measurements of the distance between the GPS receiver and GPS satellites, and the distance measurements are used to determine the GPS receiver's location.

SUMMARY

In a general aspect, wireless signals generated by a source device are detected and used to determine the location of the source device.

In some aspects, a wireless-signal source locator system includes wireless sensor devices distributed at distinct locations over a geographic region. The wireless sensor devices are configured to passively monitor wireless communication network signals in the geographic region. Each wireless sensor device is configured to receive a device signal from a mobile device in the geographic region. The device signal is formatted by the mobile device for transmission to a base station according to a wireless communication network protocol. Each wireless sensor device is further configured to receive a reference signal from a synchronization source; generate arrival-time data based on the device signal and the reference signal; and transmit, from the wireless sensor device, the arrival-time data. The wireless-signal source locator system further includes a data analysis system configured to receive the arrival-time data and to identify a location of the mobile device based on analyzing the arrival-time data generated by three or more of the wireless sensor devices.

In some aspects, a synchronization signal is sent to wireless sensor devices distributed at distinct locations over a geographic region. The wireless sensor devices are configured to passively monitor wireless signals in the geographic region. The wireless sensor devices collect wireless source signals in response to receiving the synchronization signal. Each wireless source signal includes a radio-frequency (RF) transmission from a wireless source in the geographic region. Each wireless source signal is detected by a respective wireless sensor device at a time indicated by the synchronization signal. The data analysis system receives the wireless source signals and identifies a location of a wireless source in the geographic region. The location is identified based on cross-correlating the wireless source signals collected by three or more distinct wireless spectrum-inspection devices.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
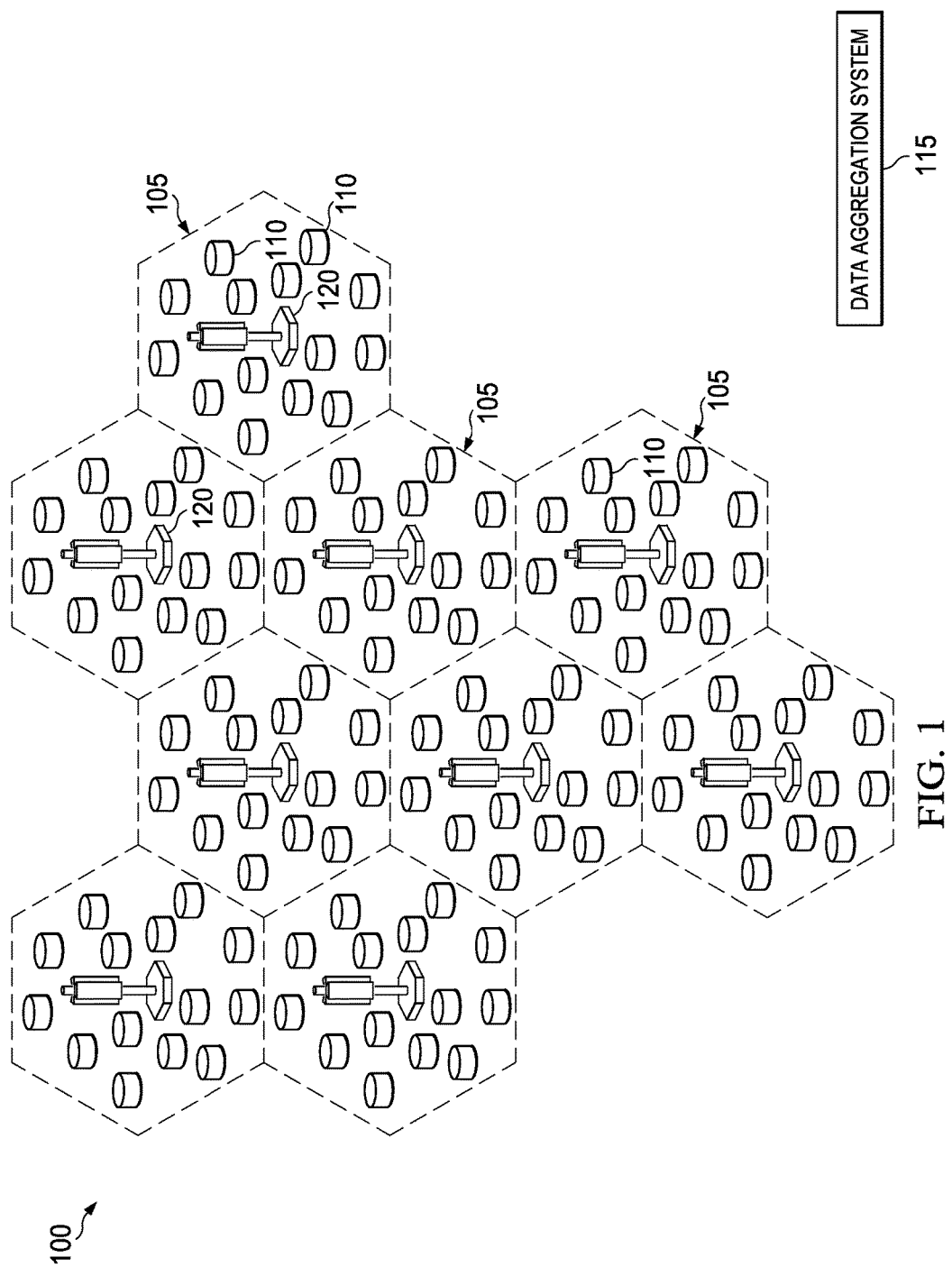
FIG. 1 is a block diagram showing an example wireless-spectrum analysis system that can identify the location of a wireless source.

In some aspects of what is described here, the locations of radio frequency (RF) sources are identified using a distributed sensor network synchronized to a common synchronization source. In some implementations, the sensor network passively detects signals transmitted by the source. For example, the source can be a mobile device that accesses wireless services of a cellular network, and the location of the mobile device can be identified using sensors that are not part of the cellular network. In some instances, the sensors (which are not part of the cellular network) detect signals transmitted from the mobile device to a cellular base-station (which is part of the cellular network), and the location of the mobile device is identified from the detected signals and information from a synchronization source. In some implementations, the synchronization source can be a base station (e.g., a base station that emits synchronization or broadcast channel), a Global Navigation Satellite System (GNSS) timing reference, a ground base transmitter that generates GNSS compatible timing reference signals, other broadcasted RF signals that carry precise timing reference, or a combination of these.

In some implementations, a wireless-signal source locator system includes a sensor network formed by a group of wireless sensor devices. In some implementations, the sensor devices detect signals transmitted from the source according to a wireless communication network protocol. For example, the sensor devices may detect signals exchanged in a cellular network, although the sensor devices themselves are not part of the cellular network. The signals detected by the sensor devices can include signals that are formatted by the source for wireless communication with a cellular base station, a Wi-Fi access point, or another wireless resource provider.

In some implementations, the group of sensor devices can be placed in a geographic area with known coordinates. Each sensor device can receive and synchronize to available wireless services in the area. In some instances, each sensor device can have receivers that receive synchronization signals from a timing synchronization source to coordinate location and obtain precise timing. For example, the sensor device can have integrated GNSS receivers. In some instances, the synchronization signals can be wireless network broadcast signals (e.g., cellular downlink frame or time-slots boundaries), GNSS timing reference, ground base transmitters that generate GNSS-compatible timing reference signals, or other signals that provides network timing synchronization.

Depending on the environment and signal strength, the target signal can be received by some or all of the sensors in the sensor network. The target signal is a signal that is transmitted by a target RF signal source to be located. Examples of a target signal include RF signals transmitted by mobile devices (smartphones, mobile terminals, etc.)—either cellular or Wi-Fi/Bluetooth, stationary or mobile sources of RF interference, unknown or fake cellular base stations, illegitimate users of the RF spectrum (amateur radio), or other signals transmitted by a target signal source.

In some implementations, each sensor device can measure the time of arrival of a target signal against the synchronization signal provided by a timing synchronization source, and the sensor devices can each access the synchronization signal from a timing synchronization source that is common to the sensor network. Information from each sensor device can be sent to a data analysis system. In some implementations, the data analysis system be a centralized processing engine or a Network Operations Center (NOC). In some cases, the data analysis system receives the arrival-time data over a communication network (e.g., an IP network or another type of communication system). The data analysis system can combine measurements from each sensor with known coordinates of each sensor and known coordinates of the timing source (in case of wireless network timing source) and form a system of non-linear equations to compute an unknown location of the target signal source. FIGS. 13-20 and associated descriptions provide additional details of example implementations.

In some instances, the time of arrival measurement by a sensor device can have an error that may contribute to errors in locating the target source. Including more sensors in the measurements or repeating the measurements multiple times and averaging the measurement results may reduce the errors.

In some implementations, the subject matter described here can be implemented in various manners that may provide technical advantages. For example, the wireless sensor devices can be low-cost devices. The number of wireless sensor devices deployed in an area, therefore, can be significantly higher than the number of base-stations in the same area. As a result, the accuracy of the localization can be much higher. In addition, the wireless sensor devices are not part of the cellular network and, therefore, can be used to determine the location of any a variety of sources, including wireless sources that are not mobile devices (e.g., microwave ovens, radio devices, etc.).

In some aspects of what is described here, wireless signals are monitored and analyzed over space and time. For example, parameters of the wireless signals can be aggregated from a number of wireless sensor devices that operate concurrently at various locations in a geographic region. The geographic region can be relatively small or large (e.g., having a radius ranging from tens or hundreds of meters to multiple kilometers) and can generally represent any area of interest (e.g., a building, city block, jurisdiction, demographic, industry, etc.). In some instances, the aggregated data can facilitate a realistic and comprehensive analysis of spectral usage and provide an understanding of the utilization and quality of wireless-spectrum and other resources in the geographic region.

In some implementations, wireless signals formatted according to various wireless communication standards are monitored and analyzed. For example, the wireless sensor devices can monitor and analyze 2G standards such as Global System for Mobile (GSM) and Enhanced Data rates for GSM Evolution (EDGE) or EGPRS; 3G standards such as Code division multiple access (CDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); wireless local area network (WLAN) or WiFi standards such as IEEE 802.11, Bluetooth, near-field communications (NFC), millimeter communications; or multiple of these or other types of wireless communication standards. In some implementations, other types of wireless communication (e.g., non-standardized signals and communication protocols) are monitored and analyzed.

In some instances, wireless-spectrum usage data and related information can be collected by or provided to (e.g., sold, subscribed, shared, or otherwise provided to) various entities. For example, wireless-spectrum usage data can be used by governmental agencies or regulatory authorities (e.g., Federal Communications Commission (FCC), etc.), standards-development organizations (e.g., 3rd Generation Partnership Project (3GPP), the Institute of Electrical and Electronics Engineers (IEEE), etc.), spectrum rights owners and licensees, wireless service providers, wireless device and chip manufactures and vendors, end users of the wireless services, or other entities.

The wireless-spectrum usage data and related information can be used for a variety of purposes. For example, governmental agencies or regulatory authorities may use the information to better regulate, control, and enforce allocated or unallocated spectrum usage rights; standards-development organizations may use the information to choose operating frequencies and develop standards to balance spectrum load (e.g., by exploiting under-loaded frequency bands and offloading congested frequency bands); and service providers may use the information to optimize or otherwise improve system hardware, software, services, or infrastructure.

With more accurate and more comprehensive spectrum usage data, targeted schemes can be designed to improve the utilization of wireless-spectrum and other resources. In some instances, based on utilization and quality of the frequency bands that they own or operate on, spectrum rights owners and licensees or wireless service providers can design, modify, or otherwise manage their own spectrum usage. For example, given the knowledge that certain geographic locations experience heavy data traffic, wireless service providers may add base stations or modify a cell configuration (e.g., adjusting a frequency reuse scheme) to accommodate the heavy data traffic in the geographic locations. As another example, given the knowledge that certain times of day experience heavier data traffic than others, wireless service providers may design promotions or policies to encourage usage during other than peak hours.

In some examples, a wireless-spectrum analysis system includes a number of wireless sensor devices and a data aggregation system. The wireless sensor devices can be distributed over various locations over a geographic region. The wireless sensor devices can monitor and analyze the RF spectrum at the respective locations and transmit information to the data aggregation system. The data aggregation system can serve as a central back-end system that aggregates, compiles, and analyzes information transmitted from the wireless sensor devices.

In some implementations, the wireless-spectrum analysis system and the individual wireless sensor device can perform various types of analysis in the frequency domain, the time domain, or both. For example, the wireless sensor devices may analyze the wireless spectrum in a frequency domain, in the time domain, or both. In some cases, the wireless sensor devices are configured to determine bandwidth, power spectral density, or other frequency attributes based on detected signals. In some cases, the wireless sensor devices are configured to perform demodulation and other operations to extract content from the wireless signals in the time domain such as, for example, signaling information included the wireless signals (e.g., preambles, synchronization information, channel condition indicator, SSID/MAC address of a WiFi network). In some cases, the wireless sensor devices are configured to detect arrival-time data based on a target signal (e.g., from a wireless source) and a synchronization signal (e.g., from a synchronization source).

In some examples, a wireless-spectrum analysis system provides a spectral-usage report based on spectral-usage data from the devices. The spectral-usage report can be provided to users (e.g., in a user interface), stored in a database (e.g., for analysis or archival purposes), transmitted to subscribers or other entities (e.g., governmental agencies or regulatory authorities, standards-development organizations, spectrum rights owners and licensees, wireless service providers, etc.), or output in another manner. In some instances, a spectral-usage report can include text, data, tables, charts, graphs or other representations of wireless-spectrum usage.

In some examples, the spectral-usage report can include frequency-domain information, time-domain information, spatial-domain information, or a combination of these and other knowledge gained from analyzing the wireless signals detected by the wireless sensor devices. The spectral-usage report can include global information and higher-level knowledge based on the data from all multiple wireless sensor devices in disparate locations. For instance, the spectral-usage report can include trends, statistics, patterns, coverage, network performance, or other information over time or space. In some implementations, the spectral-usage report can be tailored or customized based on the business, preferences, or other attributes of a particular user or entity.

In some examples, a large number of wireless sensor devices can be used at distinct locations over a geographic region to concurrently monitor wireless signals at each distinct location. Accordingly, RF signals at various locations can be inspected at the same time or during overlapping time periods, which may render a more accurate and more comprehensive inspection of wireless signals over the geographic region. In some cases, wireless sensor devices monitor wireless signals at their respective locations passively, for example, by "listening" or "watching" for RF signals over a broad range of frequencies and processing the RF signals that they detect. There may be times when no RF signals are detected, and a wireless sensor device may process RF signals (e.g., from time to time or continuously) as they are detected in the local environment of the device.

In many instances, the wireless sensor devices can detect wireless signals that have been transmitted by or between other entities or systems, for example, on a particular frequency or set of frequencies, or by natural phenomena. The source, destination, context, and nature of the wireless signals can vary. Accordingly, the wireless sensor devices may monitor wireless-spectrum usage by a variety of systems, entities, or phenomena, and the systems described here are not limited to monitoring any particular type or class of systems or protocols.

In some cases, the wireless sensor devices can be implemented as relatively low-cost, compact, and lightweight devices. The small size and portability can, in some instances, expand the applicability and enhance the flexibility of the wireless-spectrum analysis system. In some instances, wireless sensor devices can be placed at or coupled to a pico/femto cell box of a cellular system, a WiFi access point or base station, a vehicle, a router, a mobile device (e.g., a smartphone, a tablet, etc.), a computer, an Internet of Things (e.g., machine to machine (M2M)) module, a cable modem box, a home gear electronic box (e.g., TV, modem, DVD, video game stations, laptops, kitchen gear, printers, lighting, phones, clocks, thermostats, fire detection units, $CO_2$ detection units, etc.), or other places.

In some implementations, a wireless sensor device can perform computations and analyses on the raw data (e.g., the detected RF signals) on the spot, to extract a digest of relevant information (e.g., spectral-usage parameters). In some implementations, instead of transmitting the raw data to the data aggregation system, the wireless sensor devices transmit the digest extracted from the raw data, which may reduce data traffic, reduce power consumption (which may extend battery life, where applicable), and provide other advantages. In some cases, the raw data can be transmitted to the data aggregation system, for example, upon request or in other instances.

In some implementations, communication between wireless sensor devices and a data aggregation system can be based on, for example, internet protocol (IP) transport or another standard data transport protocol, which may provide more efficient data transmission. In general, messages can be transmitted from the wireless sensor devices to the data aggregation system at any time. For example, the transmission can be triggered by detected usage of the RF spectrum, initiated by a request from the data aggregation system, sent according to a predetermined schedule or periodic intervals, or otherwise. In some instances, the aggregation system can request data from a particular wireless sensor device.

In some examples, the wireless sensor devices can be deployed and controlled from a back-end system. For example, the wireless sensor devices may operate without requiring a technician on site to operate the device. In some implementations, a data aggregation system or another type of central control system can execute control operations, for example, to configure or upgrade the wireless sensor devices. In some instances, the control system can request configuration information or run internal tests on any particular wireless sensor device.

In some implementations, the wireless-spectrum analysis system can identify the location of wireless-signal sources. For example, the wireless sensor devices can detect target signals transmitted by a target source and send data to the data aggregation system. The data aggregation system include a data analysis system that analyzes the data from the wireless sensor devices to determine the location of the target source.

FIG. 1 is a block diagram showing an example wireless-spectrum analysis system 100 that can identify the location of a wireless source. The example wireless-spectrum analysis system 100 shown in FIG. 1 includes a network of wireless sensor devices 110 and a data aggregation system 115. As shown in FIG. 1, a number (e.g., tens, hundreds, or thousands) of wireless sensor devices 110 can be distributed over a geographic area encompassing multiple cells 105 of one or more cellular networks, with multiple wireless sensor devices 110 in each cell 105. In some implementations, the wireless sensor devices 110 can be distributed over another geographic region, for example, an area that does not include a cellular network. The wireless sensor devices 110 can be identical or similar to each other, or the wireless-spectrum analysis system 100 can include a variety of different wireless sensor devices 110.

As shown in FIG. 1, each cell 105 includes one or more base stations 120, which interface with user equipment (e.g., cellular phones, etc.) in a cellular network (e.g., a cellular voice network, cellular data network, etc.). Each cell 105 typically includes a single base station 120. Typically, the density of the base stations in a geographic region is determined based on a desired cell coverage and is computed during a cell planning stage and thus remains relatively fixed once the infrastructure has been deployed.

A base station 120 typically provides wireless service for mobile devices in a broad region, for example, over an entire cell 105. As such, the base stations 120 need enough power to transmit signals over a relatively large region, for example, to provide satisfactory cell coverage. Base stations typically use an array of high-power processors or high-power components with power consumption on the order of 10 Watts to 100 Watts or more, and may require cooling systems to maintain an operating temperature of the base station. For these and other reasons, base stations are often large, expensive systems. For example, a cellular base station is often composed of several antennas mounted on a tower and a building with electronics near the base of the tower, and a cellular base station can cost in the range of $100,000 to $1,000,000 or more, in some instances.

In the example shown, the wireless sensor devices 110 provide data to the data aggregation system 115. For example, the wireless sensor devices 110 may send messages (e.g., IP packets, Ethernet frames, etc.) to the data aggregation system 115 through an IP network, an Ethernet, or another communication system. For instance, the wireless-spectrum analysis system 100 may leverage existing communication and power infrastructure (e.g., public networks, private networks, wide area networks, etc.), other than (or including) the cellular networks supported by the base stations 120.

The example wireless sensor devices 110 can be modular or standalone devices that that each monitor and analyze wireless signals in a local area. In some cases, the wireless sensor devices 110 are passively interact with the cellular network, for example, without providing cellular service (e.g., to user equipment), without using the cellular network's radio resources, without supporting operation of the base stations 120, or without otherwise operating as a component of the cellular network. The wireless sensor devices 110 can include specialized hardware (e.g., customized circuits, customized chipsets, etc.) and specialized software (e.g., signal processing and analysis algorithms) for detecting and analyzing wireless signals.

In some instances, the wireless sensor devices 110 operate with low power consumption (e.g., around 0.1 to 0.2 Watts or less on average), and they can be relatively small and inexpensive. In some examples, an individual wireless sensor device can be smaller than a typical personal computer or laptop computer and can operate in a variety of environments. In some cases, the wireless sensor devices are modular, portable, compact devices that can be installed in office spaces, on urban infrastructure, in residential areas, on vehicles, or other locations. In some cases, a wireless sensor device can be manufactured for less than $100, although the actual cost will vary.

In the example shown in FIG. 1, the wireless sensor devices 110 are geographically distributed more densely than the base stations 120. As such, in some instances, the wireless sensor devices 110 can inspect the wireless-spectrum with higher location resolution and accuracy. As a particular example, a thousand wireless sensor devices 110 may be placed in various locations within a city, with approximately fifty wireless sensor devices 110 within each area of each cell 105, although the actual number will vary for individual applications. Each wireless sensor device 110 resides in a distinct location (i.e., a location that is physically distinguishable from the locations of the other wireless sensor devices 110).

The density of the wireless sensor devices 110 in a geographic area can be determined, for example, based on the area, population, location, or other factors of the geographic area. For instance, the density of the wireless sensor devices 110 in an urban area may be higher than in a rural area in some instances. In some cases, due to their relatively low cost and small size, the example wireless sensor devices 110 can be distributed throughout a cell 105 or another region of interest to provide a more economical solution for monitoring and analyzing wireless-spectrum usage throughout the region.

The wireless-spectrum analysis system 100 can be implemented, in some cases, with a high level of flexibility in system configuration and management. For example, the wireless sensor devices 110 can be portable, plug-and-play devices that can be relocated relatively easily, and can operate in a variety of locations. In some examples, the wireless sensor devices 110 have standard communication interfaces (e.g., Ethernet, WiFi, USB, etc.) and accept standard power or operate on battery power. Accordingly, the configuration of the wireless-spectrum analysis system 100 (e.g., the total number, density, and relative locations of the wireless sensor devices 110) can accommodate a variety of environments and can be modified or adjusted, for example, from time to time.

The example data aggregation system 115 can receive data (including measurements, a digest of relevant information, etc.) sent from the wireless sensor devices 110, store the data (e.g., in a database), and execute algorithms that process the aggregated data from the database to extract higher-level information. The higher-level information can include, for example, wireless-signal source locations, trends, statistics, coverage, network usage, or any other local or global information associated with the wireless sensor devices 110. The data aggregation system 115 may also control operation of the wireless sensor devices 110 and interact with them individually, for example, to provide synchronization data, to request particular data, or to perform other control operations.

Figure 2:
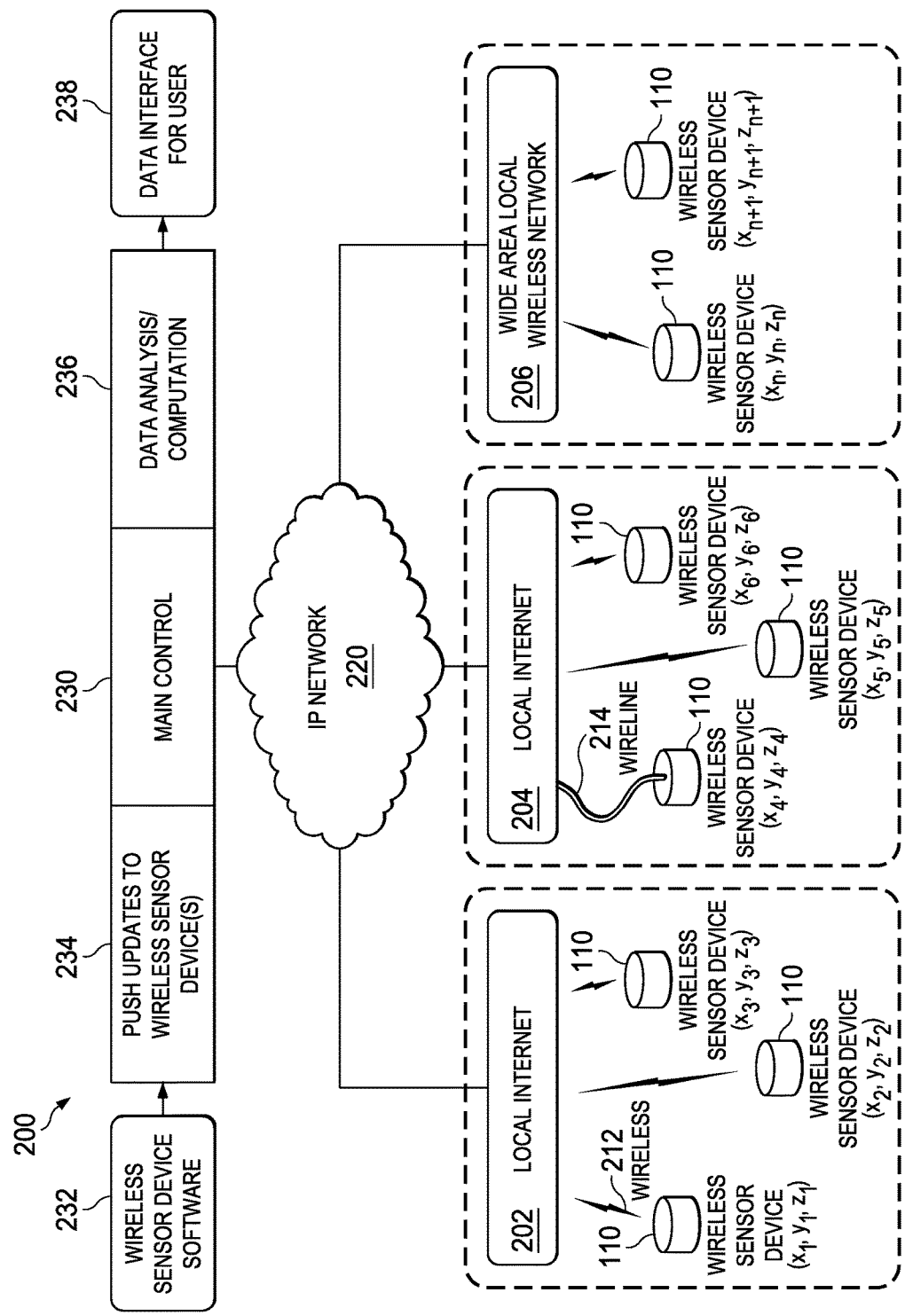
FIG. 2 is a block diagram showing architecture of an example wireless-spectrum analysis system that can identify the location of a wireless source.

FIG. 2 is a block diagram showing architecture of an example wireless-spectrum analysis system 200 that can be used to locate RF sources. The wireless-spectrum analysis system 200 can represent the wireless-spectrum analysis system 100 of FIG. 1, or another wireless-spectrum analysis system. The example wireless-spectrum analysis system 200 includes a number of wireless sensor devices 110, an IP network 220, and a main controller 230. The wireless-spectrum analysis system 200 can include additional or different components. In some implementations, a wireless-spectrum analysis system can be arranged as shown in FIG. 2 or in another suitable manner.

In the example shown in FIG. 2, each wireless sensor device 110 is implemented as a wireless sensor device at a respective physical location having spatial coordinates ($x_i$, $y_i$, $z_i$), where i varies from 1 to L (L is the number of the wireless sensor devices 110). In some implementations, each wireless sensor device can include a Global Positioning System (GPS) or another location identification system that identifies the location coordinates of the wireless sensor device, or the location coordinates can be identified in another manner. In some implementations, each wireless sensor device has a unique identifier, and the identifier can be associated with a location identifier or location coordinates.

The example wireless sensor devices can monitor and analyze wireless-spectrum in both frequency and time domains and perform in-depth analyses of wireless communication services available at the associated geographic location. For instance, the wireless sensor device can detect an RF signal in a local wireless environment about the location of the wireless sensor device at any given time. In some instances, the wireless sensor device can identify data packets and frames, extract synchronization information, cells and services identifiers, and quality measurements of RF channels (e.g., channel quality indicator (CQI)), and derive spectral-usage parameters and other information based on these and other control information and traffic data of the RF signal detected by the wireless sensor device. The control information and traffic data of the RF signal can include physical and medium access (MAC) layers information corresponding to a wireless communication standard such as 2G GSM/EDGE, 3G/CDMA/UMTS/TD-SCDMA, 4G/LTE/LTE-A, WiFi, Bluetooth, etc. The spectral-usage parameters (e.g., for particular frequencies or particular bandwidths, etc.) can include the power of detected RF signals, the signal-to-noise ratio (SNR) of detected RF signals, arrival-time data, the frequency at which detected RF signals have maximum power, or other parameters. In some implementations, the wireless sensor device can identify RF jammers and interferers, or other types of information.

In the example shown in FIG. 2, data from the wireless sensor devices (e.g., arrival-time data, or other information) are aggregated by a data aggregation or central control system (e.g., the main controller 230). In some implementations, data from the wireless sensor devices are aggregated by the main controller 230 by receiving the messages transmitted from the wireless sensor devices, for example, through the IP network (e.g., the IP network 220). In some implementations, the wireless sensor devices are connected to the IP network 220 via a local network (e.g., a local internet 202 or 204). The wireless sensor devices can be connected to the local network by a local wireline network 214 or a wireless network 212. The wireline network 214 can include, for example, Ethernet, xDSL (x-digital subscriber line), optical network, or other types of wireline communication networks. The wireless network 212 can include, for example, WiFi, Bluetooth, NFC, or other types of local wireless networks. In some implementations, some of the wireless sensor devices are connected directly to the IP network 220 using one or more wide area networks 206. The wide area networks 206 can include, for example, cellular network, satellite network, or other types of wide area networks.

The example main controller 230 can be included in the data aggregation system 115 of FIG. 1 or another back-end system. The main controller 230 can be a computing system that includes one or more computing devices or systems. The main controller 230 or any of its components can be located at a data processing center, a computing facility, or another location. In the example shown, the main controller 230 can remotely control operation of the wireless sensor devices. Example functions of the main controller 230 can include aggregating the information from some or all of the wireless sensor devices, upgrading the wireless sensor device software, monitoring states of the wireless sensor devices, etc. For example, the main controller 230 can include or be coupled to a software update module 234. In some cases, the software update module 234 can receive update for the wireless sensor device software 232, and push the software updates to wireless sensor devices.

In the example shown in FIG. 2, the main controller 230 can put the wireless sensor devices into one or more calibration or test modes, reset various elements within the wireless sensor devices, or configure any individual wireless sensor device as necessary, for example, based on the location or state of the wireless sensor device, its neighboring wireless sensor devices, or other factors. In some examples, the states of a wireless sensor device can include: (i) the temperature of the wireless sensor device, (ii) the current power consumption of the wireless sensor device, (iii) the data rate flowing from the wireless sensor device back to the main controller 230, (iv) the signal strength, SSID's, or MAC addresses of the local WiFi signals around the wireless sensor device, (v) the location of the wireless sensor device (e.g., detected an internal GPS unit in the wireless sensor device), (vi) a signal (e.g., IP packets, control signaling transmitted over the network) that provides information on the state of the wireless sensor device or its surrounding wireless sensor devices. The main controller 230 may monitor additional or different states of the wireless sensor devices.

In some implementations, the main controller 230 can include or be coupled to a communication system that receives spectrum inspection information (e.g., arrival-time data, spatial and temporal coordinates for each of the spectral-usage parameters, states of the wireless sensor devices, etc.) transmitted from the wireless sensor devices. The main controller 230 can include or be coupled to a data analysis system 236 that can aggregate (e.g., assemble, compile, or otherwise manage) the spectrum inspection information from the multiple wireless sensor devices and generate a spectral-usage report for the geographic region based on the spectral-usage parameters from the wireless sensor devices.

Figure 3:
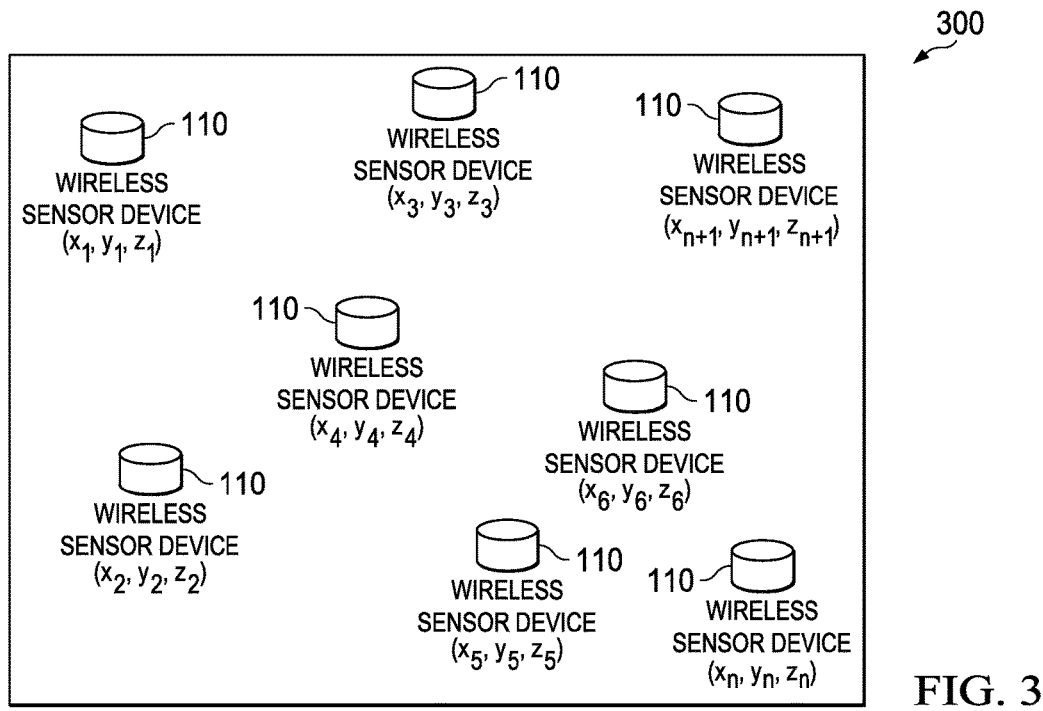
FIG. 3 is a block diagram showing an example distribution of wireless sensor devices.
Figure 4:
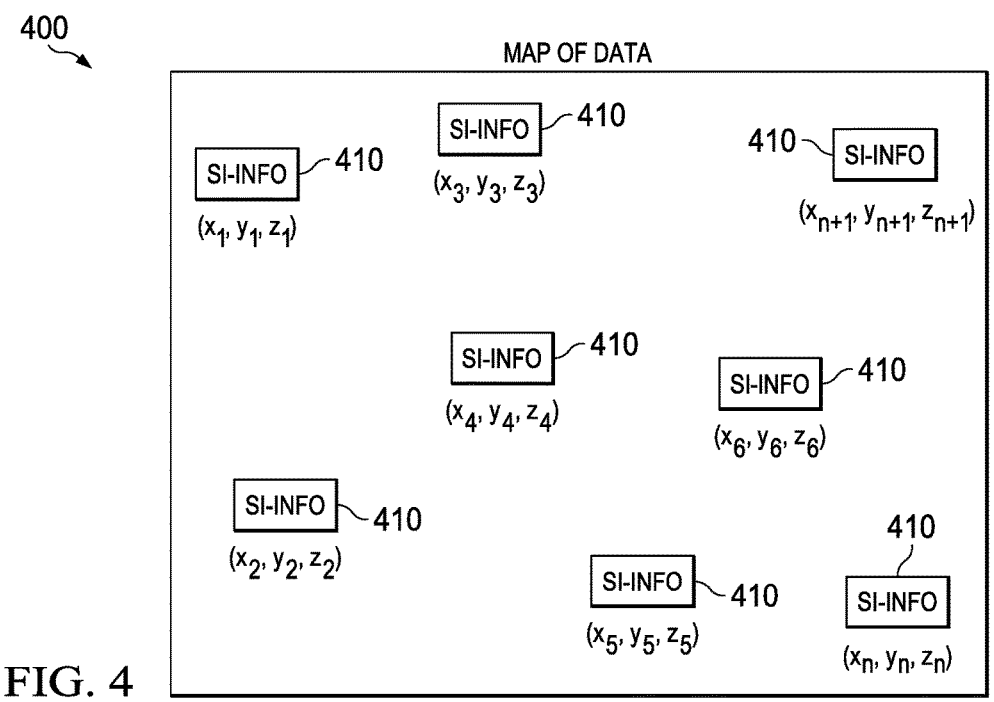
FIG. 4 is a block diagram showing example spectrum inspection (SI) information associated with wireless sensor devices.
Figure 5:
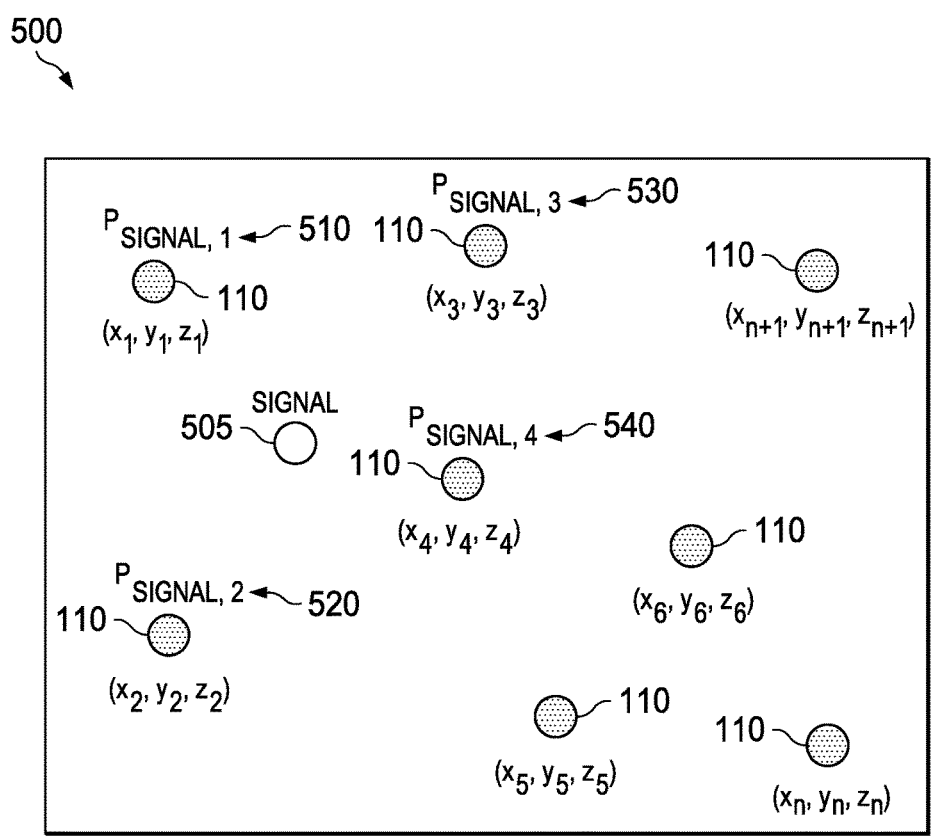
FIG. 5 is another block diagram showing example SI information associated with wireless sensor devices.

In some instances, the spectral-usage report can be presented on a data interface 238 to present users the usage, quality, or other information of the wireless-spectrum over the various locations of the wireless sensor devices. For example, the spectral-usage report can indicate detected wireless traffic levels in each of the multiple bandwidths in an RF spectrum, detected wireless traffic levels for multiple wireless communication standards, spatial and temporal distributions of wireless-spectrum usage in the geographic region, or other information. The traffic levels can include, for example, throughput, data rate, peak and valley values, or other statistics (e.g., average and variance) of the spectral-usage information. The spectral-usage report can include, for example, tables, charts, and graphs showing the detected wireless traffic levels versus space and time. For instance, the spectral-usage report can include a graph or map (e.g., as shown in FIGS. 3-5) showing the spatial distribution of wireless-spectrum usage in the geographic region. The spectral-usage report can include a bar chart or table showing the temporal distribution or trends of wireless-spectrum usage (e.g., showing the peak, average, and valley traffic amount during a day, a month, or a year). The spectral-usage report can indicate the locations of wireless sources that transmitted wireless signals in the geographic region. The locations can be indicated as coordinates, plots, etc.

In some implementations, the data analysis system 236 can analyze real-time data, historical data, or a combination of both, and determine spectral-usage parameters for a geographic region. For example, the data analysis system 236 can determine a source location for the wireless signals received by the wireless sensor devices, and the generated spectral-usage report can include an indication of the source location.

FIGS. 3 and 4 show aspects of example spatial and temporal distributions of wireless-spectrum usage in a geographic region; FIG. 5 shows aspects of example techniques for determining the source location. In some instances, similar or related information can be included in a spectral-usage report generated by the main controller 230 and displayed to the users. In some implementations, the spectral-usage report can include additional or different representations of the spectral-usage information.

FIG. 3 is a block diagram 300 showing an example spatial distribution of wireless sensor devices. As shown in FIG. 3, each wireless sensor device has a geographic location ($x_i$, $y_i$, $z_i$) and can monitor and analyze the wireless-spectrum at its respective geographic location ($x_i$, $y_i$, $z_i$). Each wireless sensor device can transmit spectrum inspection (SI) information to a data aggregation system (e.g., the main controller 230 in FIG. 2). The SI information can include, for example, spectrum data (e.g., spectral-usage parameters), arrival-time data for target signals, location and time information for each spectral-usage parameter, state information of the wireless sensor device, or other information. For example, the location and time information can include spatial coordinates of the wireless sensor device (e.g., ($x_i$, $y_i$, $z_i$) or in other coordinates) and temporal coordinates (e.g., a time of day) at which each of the spectral-usage parameters is obtained. The example block diagram 300 shows the spatial coordinates of the wireless sensor devices and serves as a map of the example spatial distribution of the wireless sensor devices in a geographic region. In some implementations, the SI information of each wireless sensor device can be superimposed onto the diagram 300 and displayed, for example, to a user.

FIG. 4 is block diagram 400 showing example SI information 410 associated with the wireless sensor devices shown in FIG. 3. In the example shown in FIG. 4, the example SI information 410 can be displayed adjacent to or on top of the respective spatial coordinates of the wireless sensor devices. The displayed SI information 410 can include some or all types of SI information described above. For example, one or more of the spectral-usage parameters can be displayed. In some implementations, temporal coordinates for each of the spectral-usage parameters can also be displayed. The information can be the same, similar, or different for each distinct wireless sensor device. Because the SI information 410 can be aggregated at a central location (e.g., the main controller 230), the SI information 410 of multiple wireless sensor devices can be correlated, compared, interpolated, or otherwise manipulated to derive further information. For example, the relative position of a source signal can be determined based on SI information of the wireless sensor devices that can detect the source signal. Additional or different information can be derived.

FIG. 5 is another block diagram 500 showing example SI information associated with the wireless sensor devices shown in FIG. 3. In this example, a detected signal power at one or more frequencies is displayed as the example SI information for each wireless sensor device at its respective location. The measured power of the signal at frequency f at locations ($x_1$, $y_1$, $z_1$), ($x_2$, $y_2$, $z_2$), ($x_3$, $y_3$, $z_3$), and ($x_4$, $y_4$, $z_4$) are denoted as $P_{signal,1}$ 510, $P_{signal,2}$ 520, $P_{signal,3}$ 530, and $P_{signal,4}$ 540, respectively. Based on the measured power levels of the multiple wireless sensor devices, the source location of the signal 505 at frequency f can be estimated, for example, automatically by a data analysis system (e.g., of the central controller). For example, the source location of the signal 505 can be determined based on the intersection of multiple arcs centered at the locations of the wireless sensor devices, e.g., ($x_1$, $y_1$, $z_1$), ($x_2$, $y_2$, $z_2$), ($x_3$, $y_3$, $z_3$), and ($x_4$, $y_4$, $z_4$). The radius of each arc can be determined based on the $P_{signal,1}$ 510, $P_{signal,2}$ 520, $P_{signal,3}$ 530, and $P_{signal,4}$ 540, the respective path losses, shadowing effects, or other propagation conditions in the local wireless environment about each of the multiple wireless sensor devices. Accordingly, the source location of the RF signals can be pinpointed and illustrated on the example map for visualization. The source location can also be identified based on a synchronization signal as described below.

Figure 6:
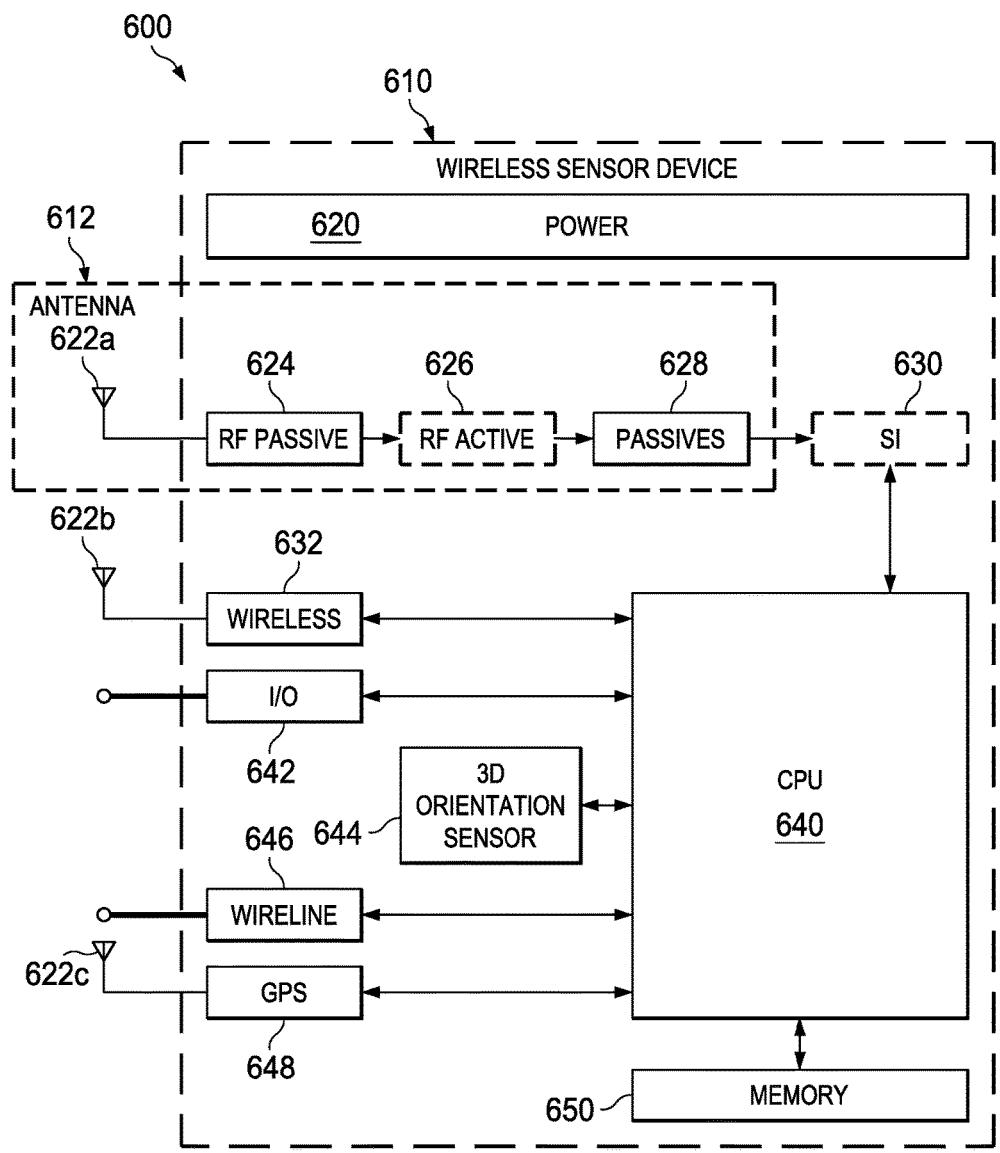
FIG. 6 is a block diagram showing an example wireless sensor device.

FIG. 6 is a block diagram showing an example wireless sensor device 600. In some cases, the wireless sensor devices of FIGS. 1-5 can be implemented as the example wireless sensor device 600 shown in FIG. 6 or as another type of wireless sensor device. The example wireless sensor device 600 includes a housing 610, an RF interface 612, a power management subsystem 620, a signal analysis subsystem (e.g., the SI subsystem 630, etc.), a CPU 640, a memory 650, communication interfaces, an input/output interface 642 (e.g., a USB connection), a GPS interface 648, and one or more sensors (e.g., 3D orientation sensors 644 such as a compass or gyroscope, temperature sensors, etc.). The wireless sensor device 600 can include additional or different components and features, and the features of the wireless sensor device can be arranged as shown in FIG. 6 or in another suitable configuration.

In some implementations, the housing 610 can be a portable housing that houses the RF interface 612, the power management subsystem 620, the signal analysis subsystem, the communication interfaces, and other components of the wireless sensor device 600. The housing can be made of plastic, metal, composites, or a combination of these and other materials. The housing can include components that are manufactured by molding, machining, extruding, or other types of processes. In some implementations, the wireless sensor device 600 can be coupled to or integrated with another device (e.g., a pico/femto cell box of a cellular system, a WiFi access point or base station, a vehicle, a router, a mobile device, a thermostat, etc.). For example, the housing 610 of the wireless sensor device 600 can be attached to, incorporated, or otherwise coupled to the other device. Alternatively, the housing 610 can be a dedicated housing that houses only the components of the wireless sensor device 600.

In some implementations, the design and arrangement of the housing 610 and components inside the housing 610 can be optimized or otherwise configured for monitoring and analyzing wireless signals. For example, the sizes, orientations, and relative locations of the components can be optimized for detecting and analyzing RF signals, and the device can be compact while accommodating all the necessary components. In some instances, the housing 610 can be on the order of, for example, 10×10×4 cm$^3$, or another size housing can be used.

In some implementations, the RF interface 612 is configured to detect RF signals in multiple bandwidths of an RF spectrum in a local wireless environment about the wireless sensor device 600. The RF interface 612 can include an antenna system and multiple radio paths that are configured to process RF signals in the respective bandwidths. In the example shown in FIG. 6, the RF interface 612 includes an antenna 622a, RF passive elements 624, RF active elements 626, and passive elements 628. The RF passive elements 624 can include, for example, matching elements, RF switches, and filters. The RF active elements 626 can include, for example, RF amplifiers. The passive elements 628 after the RF active elements 626 can include, for example, filters, matching elements, switches, and baluns.

In some examples, the signal analysis subsystem can be configured to identify the arrival-time data based on the RF signals and a synchronization signal. A signal analysis subsystem can include radio(s), digital signal processor (DSP), memory, and other components for extracting spectral parameters and for analyzing the RF spectrum. In some implementations, the combination of the RF interface 612 and the signal analysis subsystem can be referred to as a spectrum inspection (SI) signal path, which is described in greater detail with respect to FIG. 7.

The communication interfaces of the wireless sensor device 600 can be configured to transmit the spectral-usage parameters or other SI information to a remote system (e.g., the main controller 230 of FIG. 2). The communication interfaces can include one or more wireless interfaces 632 (e.g., a WiFi connection, cellular connection, etc.), a wireline interface 646 to a local network (e.g., an Ethernet connection, xDSL connection, etc.), or other types of communication links or channels. The communication interfaces can share and reuse the common antennas (e.g., using an antenna array) or they can each have distinct and dedicated antennas.

The wireless interface 632 and the wireline interface 646 can each include a modem to communicate with the local or wide area network. For example, the wireless interface 632 and the wireline interface 646 can send SI information to a data aggregation system (e.g., the main controller 230 of FIG. 2) and receive control information (e.g., software updates) from the data aggregation system, via the local or wide area network. In some implementations, a wireless sensor device can be equipped with either or both of the communication interfaces. The wireline interface 646 can allow the example wireless sensor device 600 to exploit existing wireline communication infrastructure (e.g., in a building) and large transmission capacity of wireline communications (e.g., large bandwidth provided by optical network, advanced digital subscriber line technologies, etc.). The wireless interface 632 can enhance the mobility and flexibility of the example wireless sensor device 600 such that it can deliver SI information at a variety of locations and times, using Bluetooth, WiFi, cellular, satellite, or other wireless communication technologies.

In some implementations, the wireless interface 632 and the RF interface 612 can share hardware or software components (or both). In some implementations, the wireless interface 632 and the RF interface 612 can be implemented separately. In some implementations, the RF interface 612 is mainly responsible for signal reception rather than transmission, and the RF interface 612 can be implemented with specialized lower-power circuitry and thus reduce the overall power consumption of the wireless sensor device 600.

The power management subsystem 620 can include circuits and software for providing and managing power to the wireless sensor device 600. In some implementations, the power management subsystem 620 can include a battery interface and one or more batteries (e.g., rechargeable batteries, a smart battery with an embedded microprocessor, or a different type of internal power source). The battery interface may be coupled to a regulator, which may assist the battery in providing direct current electrical power to the wireless sensor device 600. As such, the wireless sensor device 600 can include a self-contained power supply and can be used at arbitrary locations without need for other external energy sources. Additionally or alternatively, the power management subsystem 620 can include an external power interface that receives power from an external source (e.g., an alternating current power source, an adapter, a converter, etc.). As such, the wireless sensor device 600 can be plugged into an external energy source.

In some implementations, the power management subsystem 620 can oversee and manage power consumption of the wireless sensor device 600. For example, the power management subsystem 620 can monitor the power consumption of the RF interface 612, communication interfaces, the CPU 640, and other components of the wireless sensor device 600, and report the power consumption state of the wireless sensor device 600, for example, to a central controller. In some implementations, the wireless sensor device 600 can be designed to have low power consumption, and the power management subsystem 620 can be configured to send an alert to the central controller or intervene with the operations of the wireless sensor device 600 if the power consumption exceeds a threshold. The power management subsystem 620 can include additional or different features.

The CPU 640 can include one or more processors or another type of data-processing apparatus that can execute instructions, for example, to manage the operations of the wireless sensor device 600. The CPU 640 may perform or manage one or more of the operations of a wireless sensor device described with respect to FIGS. 1-5. In some implementations, the CPU 640 can be part of the SI subsystem 630. For example, the CPU 640 can process, compute, and otherwise analyze the measured wireless-spectrum data (e.g., from the RF interface 612). In some cases, the CPU 640 can execute or interpret software, scripts, programs, functions, executables, or other modules contained in the memory 650.

The input/output interface 642 can be coupled to input/output devices (e.g., a USB flash drive, a display, a keyboard, or other input/output devices). The input/output interface 642 can assist data transfer between the wireless sensor device 600 and the external storage or display device, for example, over communication links such as a serial link, a parallel link, a wireless link (e.g., infrared, radio frequency, or others), or another type of link.

The memory 650 can include, for example, a random access memory (RAM), a storage device (e.g., a writable read-only memory (ROM) or others), a hard disk, or another type of storage medium. The memory 650 can store instructions (e.g., computer code) associated with operations of the wireless sensor device 600, a main controller, and other components in a wireless-spectrum analysis system. The memory 650 can also store application data and data objects that can be interpreted by one or more applications or virtual machines running on the wireless sensor device 600. The memory 650 can store, for example, location data, environment data, and state data of the wireless sensor device 600, wireless-spectrum data, and other data.

In some implementations, the wireless sensor device 600 can be programmed or updated (e.g., reprogrammed) by loading a program from another source (e.g., from a central controller through a data network, a CD-ROM, or another computer device in another manner). In some instances, the central controller pushes software updates to the wireless sensor device 600 as the updates become available, according to a predetermined schedule, or in another manner.

Figure 7:
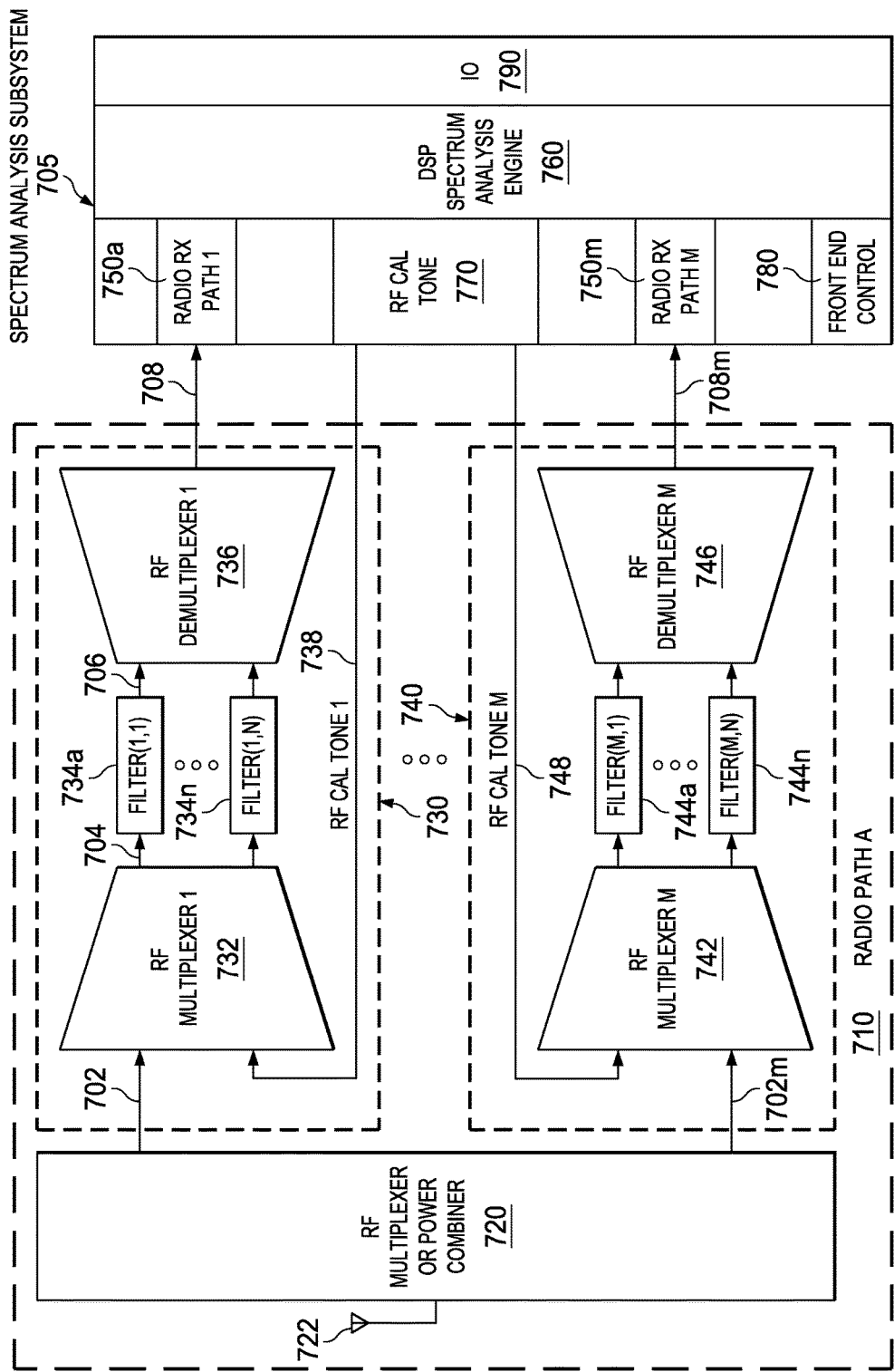
FIG. 7 is a block diagram showing an example SI signal path of a wireless sensor device.

FIG. 7 is a block diagram showing an example spectrum inspection (SI) signal path 700. The SI signal path 700 includes an RF interface 710 (e.g., denoted as Radio Path A) and a spectrum analysis subsystem 705. The RF interface 612 of the wireless sensor device 600 of FIG. 6 can be implemented as the example RF interface 710 in FIG. 7 or in another manner. The SI subsystem 630 of the wireless sensor device 600 of FIG. 6 can be implemented as the example spectrum analysis subsystem 705 in FIG. 7 or in another manner. In some cases, the SI signal path 700 can perform all necessary operations for monitoring and analyzing the wireless signals. For example, the SI signal path 700 can perform functions of a typical wireless receiver such as demodulation, equalization, channel decoding, etc. The SI signal path 700 can support signal reception of various wireless communication standards and access the spectrum analysis subsystem 705 for analyzing the wireless signals.

In the example shown, the RF interface 710 can be a wideband or narrowband front-end chipset for detecting and processing RF signals. For example, the RF interface 710 can be configured to detect RF signals in a wide spectrum of one or more frequency bands, or a narrow spectrum within a specific frequency band of a wireless communication standard. In some implementations, an SI signal path 700 can include one or more RF interfaces 710 to cover the spectrum of interest. Example implementations of such an SI signal path are described with respect to FIG. 8.

In the example shown in FIG. 7, the RF interface 710 includes one or more antennas 722, an RF multiplexer 720 or power combiner (e.g., an RF switch), and one or more signal processing paths (e.g., "path 1" 730, ..., "path M" 740). The antenna 722 could be a multi-port antenna or single-port antenna. The antenna 722 can include an omni-directional antenna, a directional antenna, or a combination of one or more of each. The antenna 722 is connected to an RF multiplexer 720. In some implementations, the RF interface 710 can be configured to use the one or more antennas 722 for detecting the RF signals based on single-input single-output (SISO), single-input and multiple-output (SIMO), multiple-input and single-output (MISO) or multiple-input and multiple-output (MIMO) technologies.

In some implementations, an RF signal in the local environment of a wireless sensor device can be picked up by the antenna 722 and input into the RF multiplexer 720. Depending on the frequency of the RF signal that needs to be analyzed, the signal 702 output from the RF multiplexer 720 can be routed to one of the processing paths (i.e., "path 1" 730, ..., "path M" 740). Here, M is an integer. Each path can include a distinct frequency band. For example, "path 1" 730 may be used for RF signals between 1 GHz and 1.5 GHz, while "path M" may be used for RF signals between 5 GHz and 6 GHz. The multiple processing paths may have a respective central frequency and bandwidth. The bandwidths of the multiple processing paths can be the same or different. The frequency bands of two adjacent processing paths can be overlapping or disjointed. In some implementations, the frequency bands of the processing paths can be allocated or otherwise configured based on the assigned frequency bands of different wireless communication standards (e.g., GSM, LTE, WiFi, etc.). For example, it can be configured such that each processing path is responsible for detecting RF signals of a particular wireless communication standard. As an example, "path 1" 730 may be used for detecting LTE signals, while the "path M" 740 may be used for detecting WiFi signals.

Each processing path (e.g., "processing path 1" 730, "processing path M" 740) can include one or more RF passive and RF active elements. For example, the processing path can include an RF multiplexer, one or more filters, an RF de-multiplexer, an RF amplifier, and other components. In some implementations, the signals 702, 702m output from the RF multiplexer 720 can be applied to a multiplexer in a processing path (e.g., "RF multiplexer 1" 732, ..., "RF multiplexer M" 742). For example, if "processing path 1" 730 is selected as the processing path for the signal 702, the signal 702 can be fed into "RF multiplexer 1" 732. The RF multiplexer can choose between the signal 702 coming from the first RF multiplexer 720 or the RF calibration (cal) tone 738 provided by the spectrum analysis subsystem 705. The output signal 704 of "RF multiplexer 1" 732 can go to one of the filters, Filter(1,1) 734a, ..., Filter (1,N) 734n, where N is an integer. The filters further divide the frequency band of the processing path into a narrower band of interest. For example, "Filter(1,1)" 734a can be applied to the signal 704 to produce a filtered signal 706, and the filtered signal 706 can be applied to "RF de-multiplexer 1" 736. In some instances, the signal 706 can be amplified in the RF de-multiplexer. The amplified signal 708 can then be input into the spectrum analysis subsystem 705.

Similarly, if "processing path M" 740 is selected as the processing path for the signal 702m, the signal 702m can be fed into "RF multiplexer M" 742. The RF multiplexer can choose between the signal 702m coming from the first RF multiplexer 720 or the RF calibration (cal) tone 748 provided by the spectrum analysis subsystem 705. The output signal of "RF multiplexer M" 742 can go to one of the filters, Filter(M,1) 744a, ..., Filter (M,N) 744n, where N is an integer. In some instances, the output signal of the filters can be amplified in the RF de-multiplexer 746. The amplified signal 708m can then be input into the spectrum analysis subsystem 705.

The spectrum analysis subsystem 705 can be configured to convert the detected RF signals into digital signals and perform digital signal processing to identify information based on the detected RF signals. The spectrum analysis subsystem 705 can include one or more SI radio receive (RX) paths (e.g., "SI radio RX path 1" 750a, "SI radio RX path M" 750m), a DSP spectrum analysis engine 760, an RF calibration (cal) tone generator 770, a front-end control module 780, and an I/O 790. The spectrum analysis subsystem 705 may include additional or different components and features.

In the example shown, the amplified signal 708 is input into "SI radio RX path 1" 750a, which down-converts the signal 708 into a baseband signal and applies gain. The down-converted signal can then be digitalized via an analog-to-digital converter. The digitized signal can be input into the DSP spectrum analysis engine 760. The DSP spectrum analysis engine 760 can, for example, identify packets and frames included in the digital signal, read preambles, headers, or other control information embedded in the digital signal (e.g., based on specifications of a wireless communication standard), determine the signal power and SNR of the signal at one or more frequencies or over a bandwidth, channel quality and capacity, traffic levels (e.g., data rate, retransmission rate, latency, packet drop rate, etc.), or other spectral-usage parameters. The output (e.g., the spectral-usage parameters) of the DSP spectrum analysis engine 760 can be applied and formatted to the I/O 790, for example, for transmission of the spectral-usage parameters to the data aggregation system via one or more communication interfaces of the wireless sensor device.

The RF calibration (cal) tone generator 770 can generate RF calibration (cal) tones for diagnosing and calibration of the radio RX paths (e.g., "radio RX path 1" 750a, ... "radio RX path M" 750m). The radio RX paths can be calibrated, for example, for linearity and bandwidth.

Figure 8:
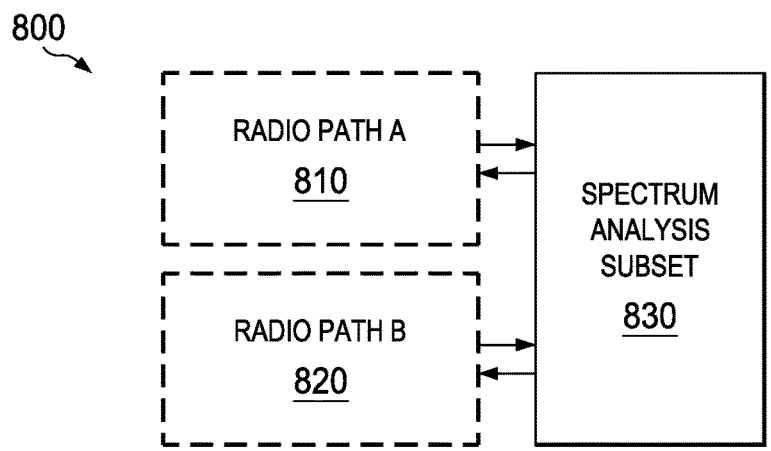
FIG. 8 is a block diagram showing another example SI signal path of a wireless sensor device.

FIG. 8 is a block diagram showing another example implementation of an SI signal path 800 of a wireless sensor device. In some instances, the SI signal path can include multiple RF interfaces (radio paths) that are connected to multiple different antennas. In the example shown in FIG. 8, the SI signal path 800 includes a radio path A 810 and a radio path B 820, each coupled to a spectrum analysis subsystem 830. The radio path A 810 and radio path B 820 can be configured in a similar manner as the RF interface or radio path A 710 of FIG. 7, or they can be configured in another manner. The radio path A 810 and radio path B 820 can have the same or different configuration, for example, covering the same or different frequency bands for wireless-spectrum monitoring and analysis.

Figure 9:
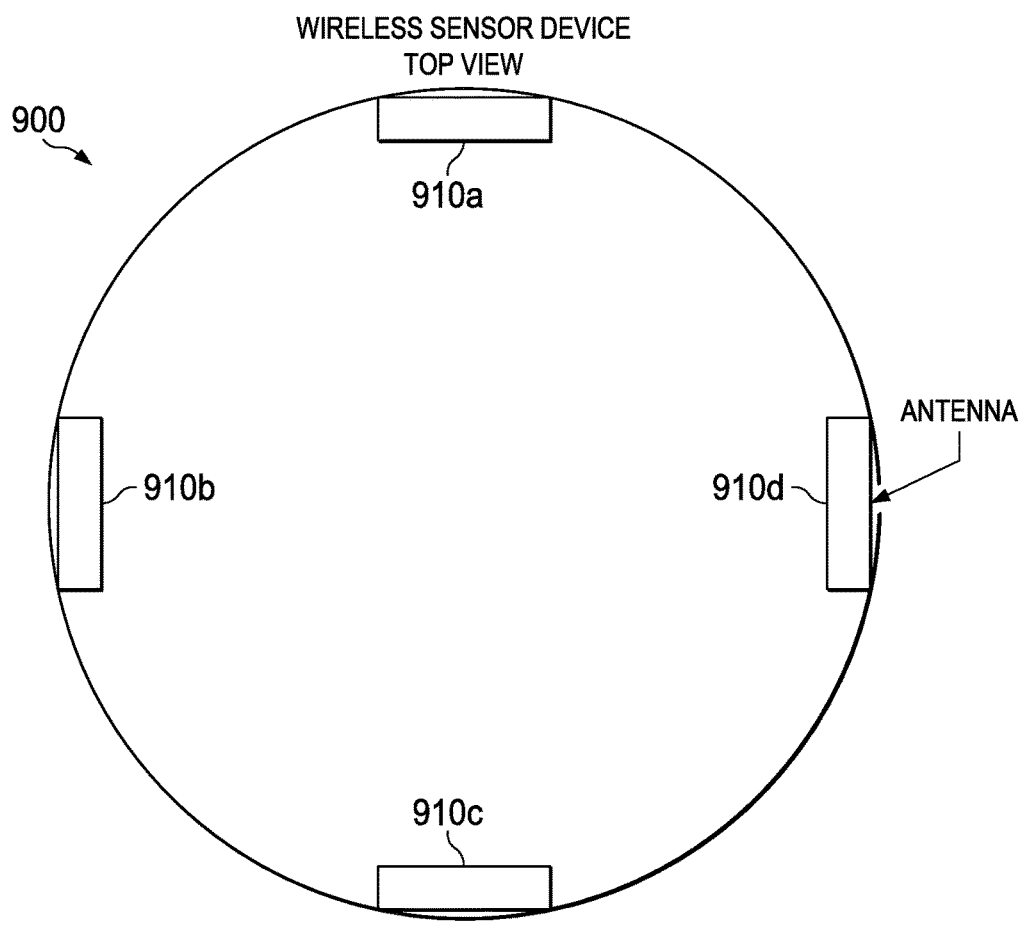
FIG. 9 is a top view of an example wireless sensor device.

FIG. 9 is a top view of an example wireless sensor device 900. In some cases, the wireless sensor devices of FIGS. 1-5 can be implemented as the example wireless sensor device 900 shown in FIG. 9 or as another type of wireless sensor device. The example wireless sensor device 900 in FIG. 9 can include some or all of the features shown in FIGS. 6-7, or the wireless sensor device 900 in FIG. 9 can include fewer, additional, or different features. The wireless sensor device 900 can include one or more antennas, for example, connected to one or more RF interfaces inside a housing of the wireless sensor device 900. For instance, the antennas of the example wireless sensor device 900 can be the antennas 622a-c of FIG. 6 or the antenna 722 of FIG. 7.

The antennas can be strategically arranged on the wireless sensor device 900 for reception of RF signals. The example wireless sensor device 900 shown in FIG. 9 includes four antennas 910a-d placed ninety degrees from each other relative to the center of the wireless sensor device 900. In some instances, the antennas can be arranged with a different degree of separation, orientation, or position, for example, based on the total number of antennas, the antenna profiles, the location and orientation of the wireless sensor device 900, or other factors.

Figure 10:
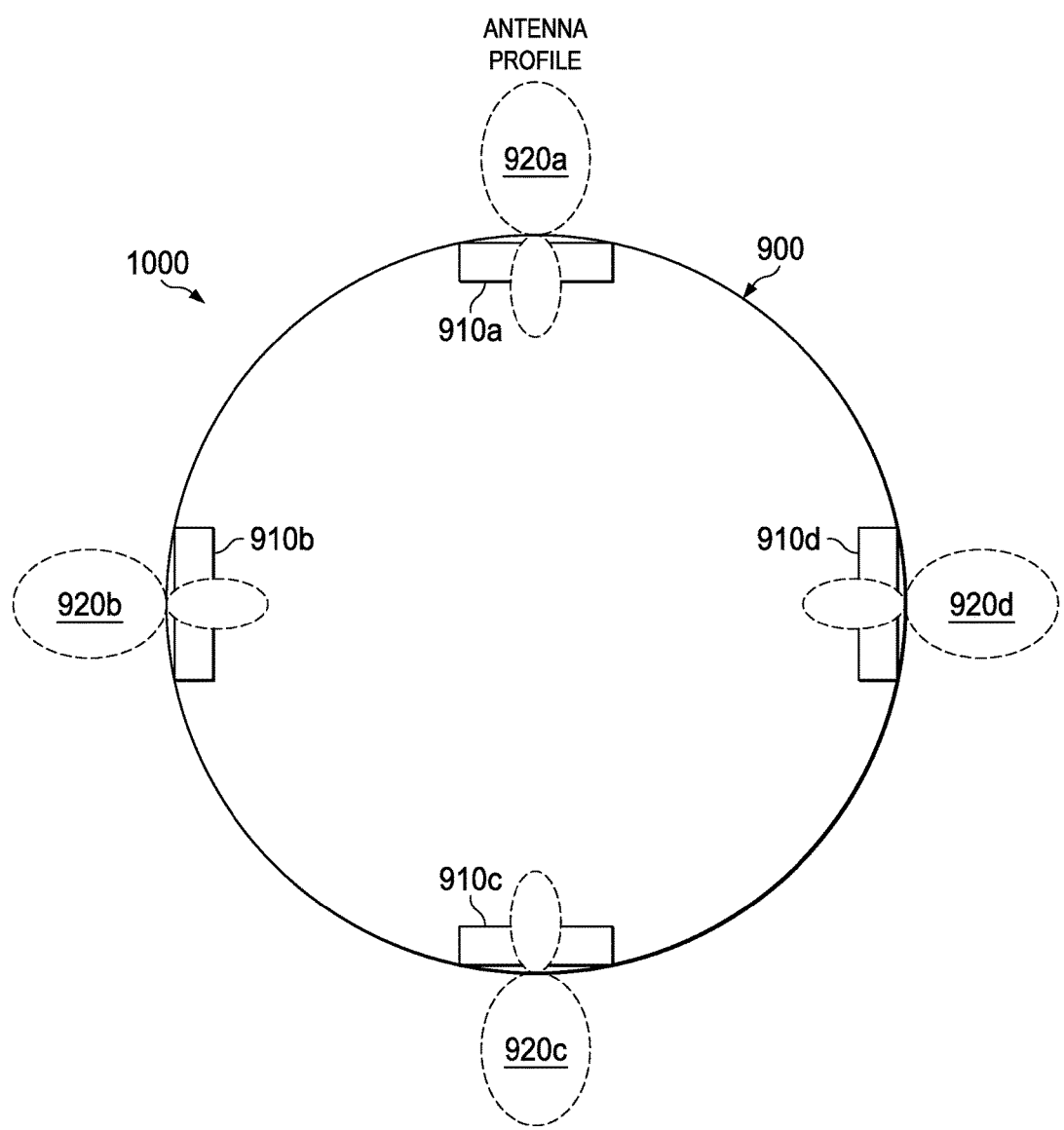
FIG. 10 is a top view of example antenna profiles of the antennas 910*a-d* of the example wireless sensor device 900 of FIG. 9.

FIG. 10 is a top view 1000 of example antenna profiles of the antennas 910a-d of the example wireless sensor device 900 of FIG. 9. In the example shown in FIG. 10, the antennas 910a-d have respective antenna profiles or patterns 920a-d, respectively. The antenna profiles 920a-d can be the same or different. The antenna profiles 920a-d can be selected or otherwise configured, for example, based on the frequency or frequency band of interest, the desired antenna gain, or other factors.

Figure 11:
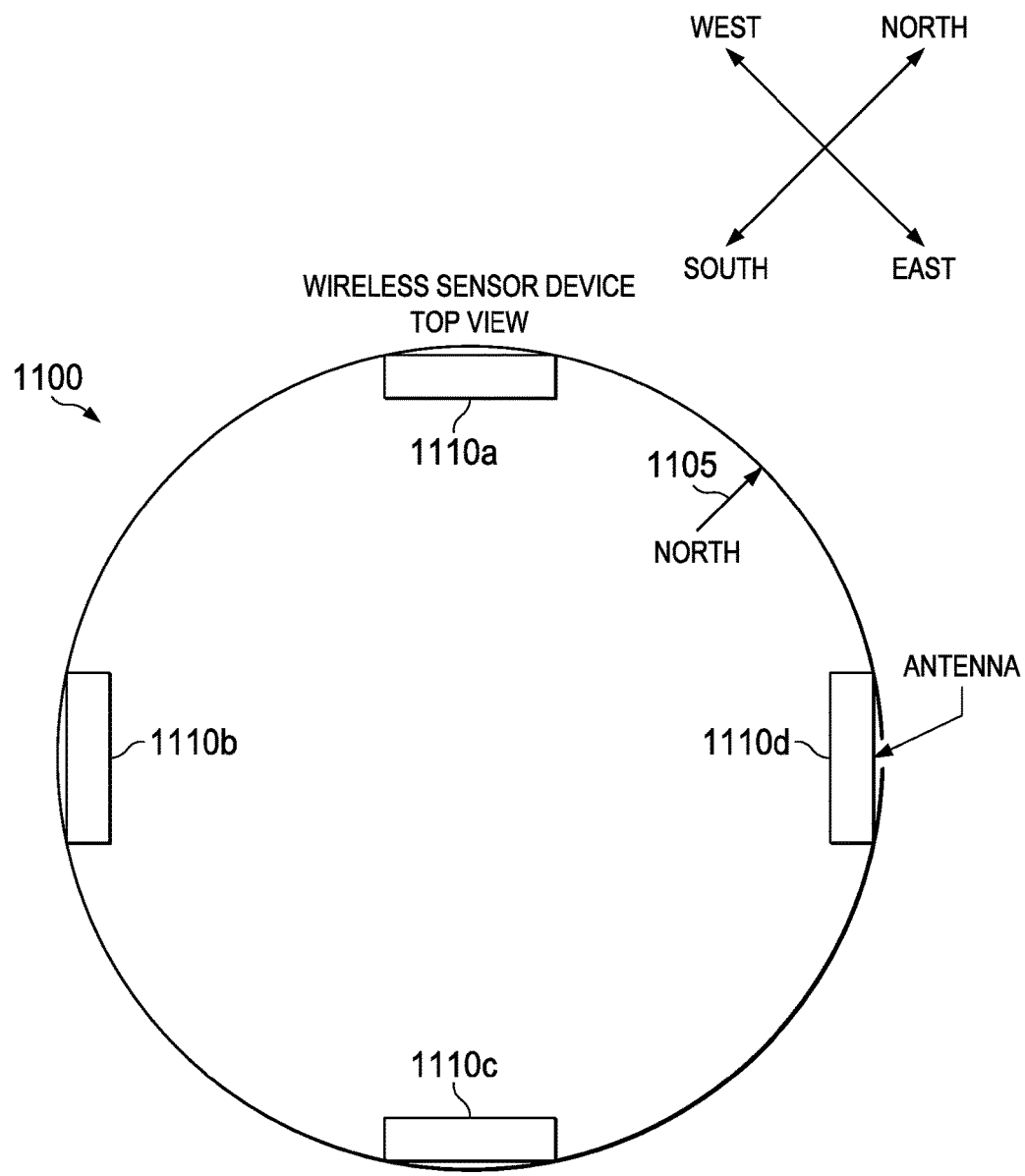
FIG. 11 is a top view of another example wireless sensor device.

FIG. 11 is a top view of another example wireless sensor device 1100. In some cases, the wireless sensor devices of FIGS. 1-5 can be implemented as the example wireless sensor device 1100 shown in FIG. 11 or as another type of wireless sensor device. The example wireless sensor device 1100 in FIG. 11 can include some or all of the features shown in FIGS. 6-10, or the wireless sensor device 1100 in FIG. 11 can include fewer, additional, or different features.

The wireless sensor device 1100 includes four antennas 1110a-d and a reference direction indicator 1105 on the wireless sensor device 1100. In some cases, the antennas 1110a-d are oriented or configured with respect to cardinal directions or another coordinate system according to the reference direction indicator 1105. In the example shown in FIG. 11, the reference direction indicator 1105 is oriented along the North compass direction. Another reference direction can be used. The orientations and displacements of the antennas 1110a-d can be identified and, in some cases, adjusted with respect to the reference direction indicator 1105.

In some implementations, a wireless sensor device can be a portable, modular device. For example, some wireless sensor devices can be moveable or reconfigurable for use in multiple locations (e.g., in series), without having to substantially deconstruct or disassemble the device. In some cases, wireless sensor devices are interchangeable with each other, so that the network of wireless sensor devices can be conveniently upgraded, expanded, tailored, or otherwise modified.

In some cases, a wireless sensor device can be installed by one or more operators, for example, by positioning the device and connecting it to standard power and data links. In some cases, a wireless sensor device can be secured in place by fasteners (e.g., screws, bolts, latches, adhesive, etc.), or a wireless sensor device can rest in a free position (e.g., without fasteners). In some instances, wireless sensor devices can operate in a variety of locations and environments. As an example, some wireless sensor devices can be installed in a vehicle (e.g., a car, a bus, a train, a ship, etc.) where the wireless sensor device can monitor and analyze the spectrum while in motion. In other examples, wireless sensor devices can be installed on traffic infrastructure, communication infrastructure, power infrastructure, dedicated real property, industrial systems, urban or commercial buildings, residential areas, and other types of locations.

Figure 12:
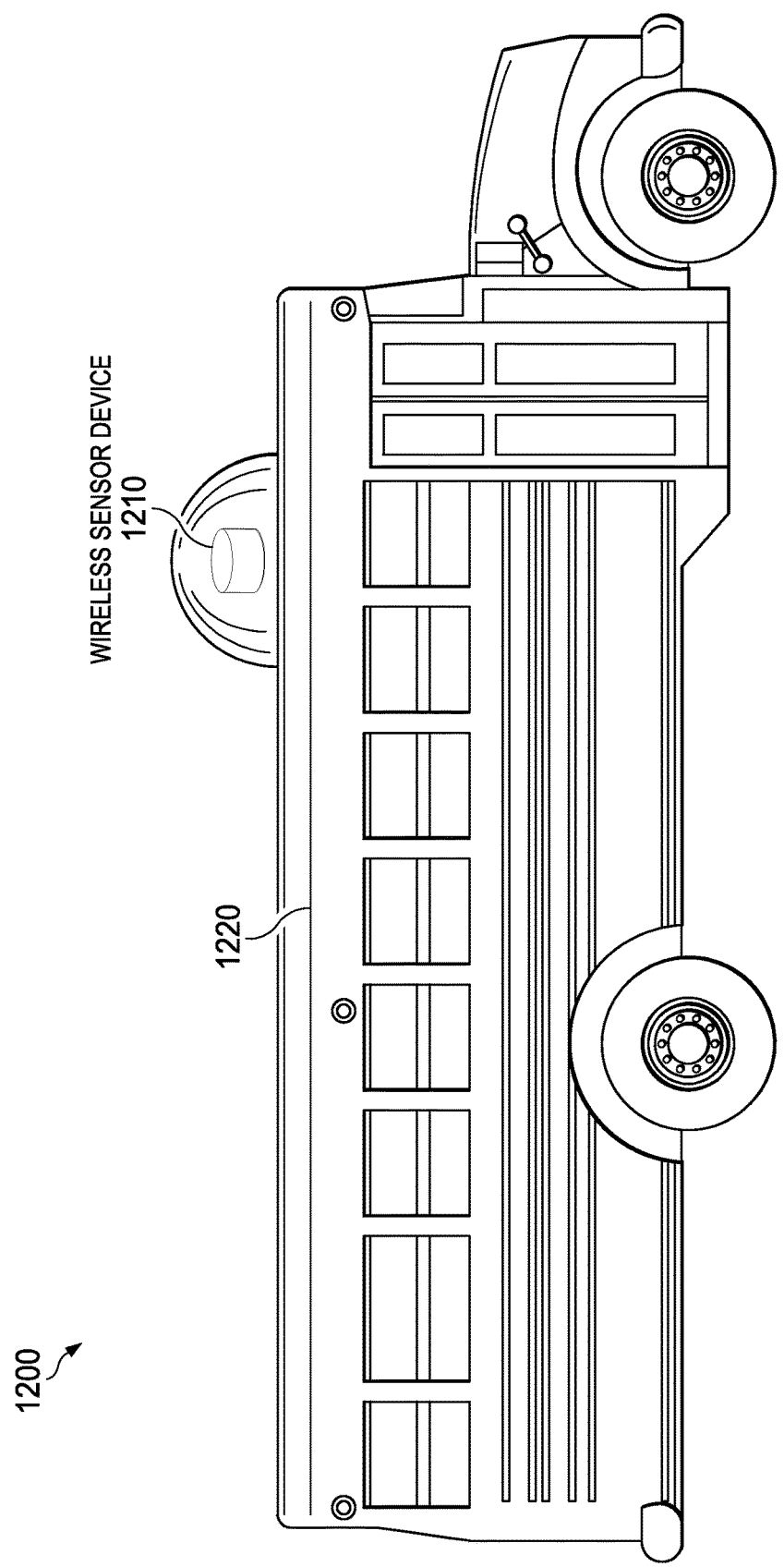
FIG. 12 is a block diagram showing an example application of a wireless sensor device.

FIG. 12 is a block diagram 1200 showing an example application of a wireless sensor device 1210, where the wireless sensor device 1210 is mounted on a bus 1220. The wireless sensor device 1210 can record its varying geographic locations, monitor wireless signals at each location, and transmit the spectrum inspection information to a central controller as the bus 1220 moves. In some implementations, the wireless sensor device 1210 can be configured to monitor and analyze the spectrum used by passengers on the bus 1220. For example, the wireless sensor device 1210 may detect identifiers of cellphones used by the passengers, detect cellular or WiFi signals transmitted and received by the cellphones of the passengers, and derive spectral-usage parameters specific to the RF traffic occurring within or around the bus 1220. The wireless sensor device 1210 can be configured in another manner. In some cases, the wireless sensor device 1210 can leverage power and communication capabilities of the bus 1220, or the wireless sensor device 1210 can include independent power and communications capabilities.

Figure 13:
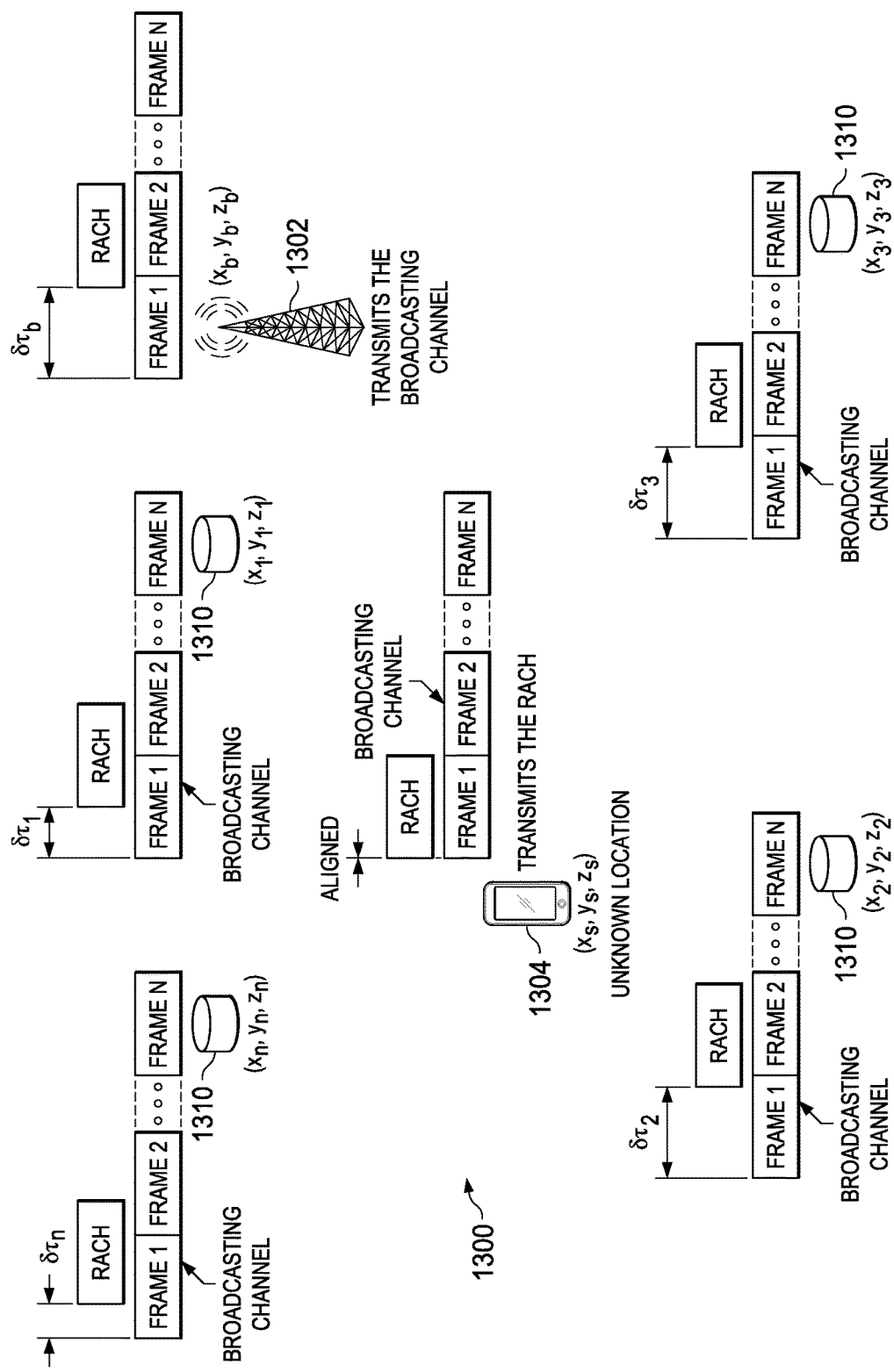
FIG. 13 is block diagram showing an example technique to identify the location of a cellular-connected device.

FIG. 13 is block diagram 1300 showing an example technique for identifying the location of a cellular connected device. As shown in FIG. 13, the block diagram 1300 includes several wireless sensor devices 1310 that are located at positions having spatial coordinates $(x_1, y_1, z_1)$, $(x_2, y_2, z_2)$, $(x_3, y_3, z_3)$, and $(x_n, y_n, z_n)$, where n is the n-th sensor device in a sensor network. The block diagram 1300 also includes a base-station 1302 located at $(x_b, y_b, z_b)$ and a target mobile device 1304 at an unknown location of $(x_s, y_s, z_s)$.

In the example shown, the target mobile device 1304 and the base-station 1302 operate in the same cellular network. According to the cellular network standard the base-station 1302 can transmit a broadcast channel signal to one or more mobile devices in a cell. The target mobile device 1304 can receive the broadcast channel signal and transmit an access channel signal to connect with the base-station 1302 and obtain cellular network services. In some cases, e.g., if the cellular network is an LTE network, the access channel signal can be a Random Access Channel (RACH) request. In some cases, the RACH request can be synchronized with the broadcast channel signal received at the target mobile device 1304. For example, the RACH request can be aligned in time to the edge of a frame, e.g., frame1 as shown in FIG. 13. In some instances, the base-station 1302 can receive the RACH at time $\delta\tau_b$ after the broadcasting channel signal is transmitted.

In some implementations, the wireless sensor devices 1310 can passively monitor the signals transmitted in cellular networks that operate in any of multiple distinct cellular network standards. For example, the wireless sensor devices 1310 can monitor the cellular network signals without requesting services from the cellular network, and without sending data to the cellular network. In some instances, the wireless sensor devices 1310 can identify the wireless communication protocols and the uplink/downlink frequencies used by the cellular networks. The wireless sensor devices 1310 can receive both the broadcasting channel and the RACH. The wireless sensor devices 1310 can calculate the time differences between these two signals, which are denoted as $\delta\tau_i$ in FIG. 13, where i is the index of the wireless sensor device 1310 and i=1, 2, 3 . . . n. The wireless sensor devices 1310 can also determine the location of the base-station 1302. For example, the wireless sensor device 1310 can detect the unique identifier of the base-station 1302 and determine the location of the base-station 1302 from a publicly available database. The wireless sensor devices 1310 can send the time differences $\delta\tau T_i$ to a data analysis system (e.g., the main controller 230 in FIG. 2). In some cases, one or more wireless sensor devices 1310 can receive the response of the base-station 1302 to the RACH request sent by the target mobile device 1304. The response can include the time offset between the RACH request arrival and the downlink frame boundary of the base-station 1302, i.e., $\delta\tau_b$. The wireless sensor devices 1310 can send $\delta\tau_b$ to the data analysis system as an additional arrival-time measurement to improve the accuracy of location determination. In some cases, the wireless sensor devices 1310 can also send their own locations, the location of the base station, and a combination thereof to the data analysis system.

In some implementations, the data analysis system can form a system of non-linear equations based on the time differences $\delta\tau_i$ received from the wireless sensor devices 1310. For example, the locations of the wireless sensor devices 1310, the base-station 1302, and the target mobile device 1304 can be represented with the following vectors:

$$\vec{r}_s = (x_s, y_s, z_s)$$

$$\vec{r}_b = (x_b, y_b, z_b)$$

$$\vec{r}_i = (x_i, y_i, z_i)$$

The system of non-linear equations can include n equations based on the time differences $\delta\tau_i$. The following represents an example of the equations:

$$c\delta\tau_i = [|\vec{r}_s - \vec{r}_b| + |\vec{r}_s - \vec{r}_i|] - |\vec{r}_i - \vec{r}_b|,$$

where c is the speed of light

The data analysis system can then solve the system of non-linear equations and determine the location of the target mobile device 1304, i.e. $\vec{r}_s$. In some implementations, the location of the target mobile device 1304 can be determined based on arrival-time data generated by three or more wireless sensor devices 1310. The accuracy of the location determination can be improved with more data, e.g., arrival data from additional wireless sensor devices or more than one base-stations.

Figure 14:
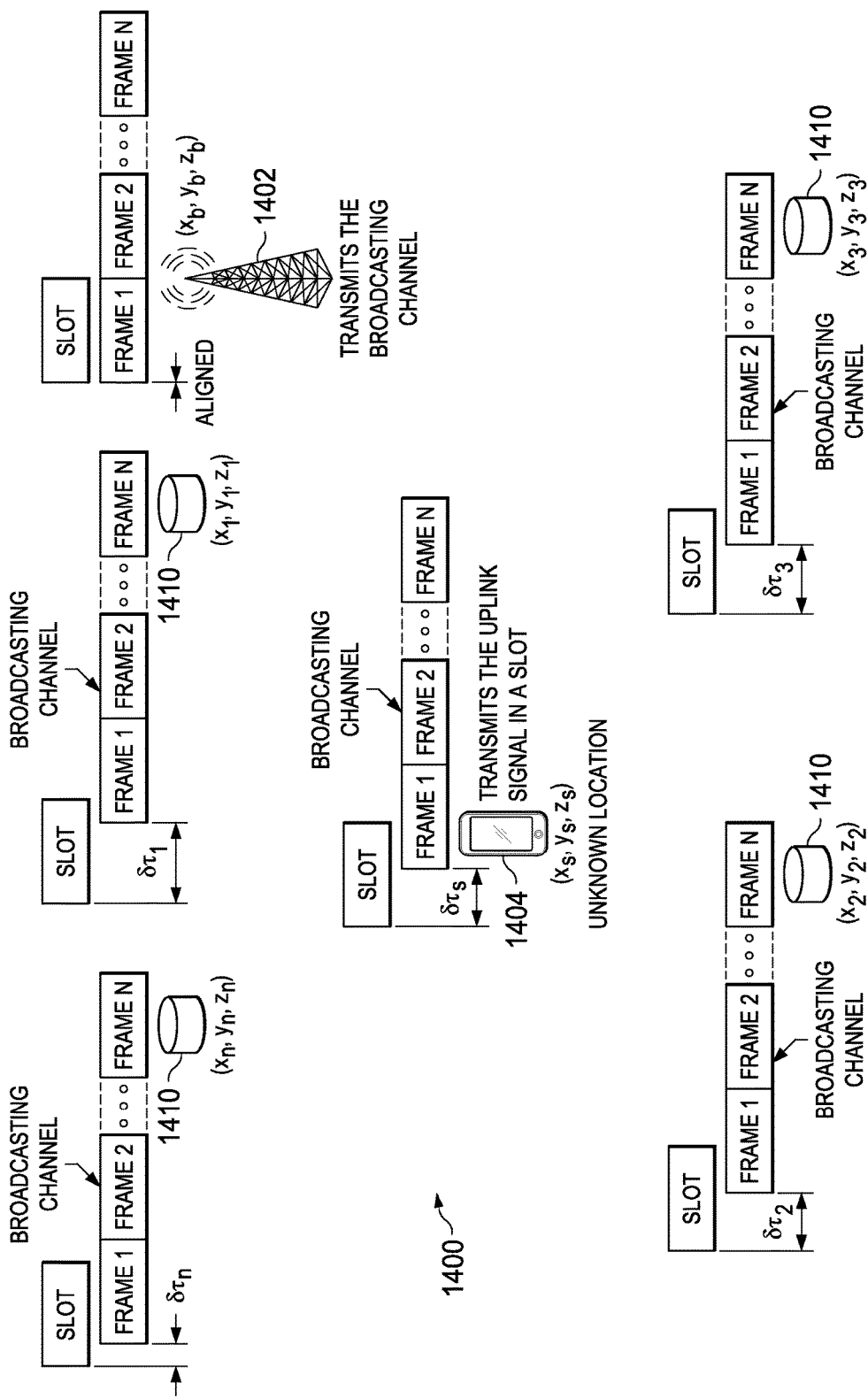
FIG. 14 is block diagram showing another example technique to identify the location of a cellular-connected device.

FIG. 14 is block diagram 1400 showing another example technique for identifying the location of a cellular device. As shown in FIG. 14, the block diagram 1400 includes several wireless sensor devices 1410 that are located at positions having the spatial coordinates $(x_1, y_1, z_1)$, $(x_2, y_2, z_2)$, $(x_3, y_3, z_3)$, and $(x_n, y_n, z_n)$, where n is the n-th sensor device in a sensor network. The block diagram 1400 also includes a base-station 1402 located at $(x_b, y_b, z_b)$ and a target mobile device 1404 at an unknown location of $(x_s, y_s, z_s)$.

In the example shown, the target mobile device 1404 and the base-station 1402 operate in the same cellular network. According to the cellular network standard, the base-station 1402 can transmit a broadcast channel signal to one or more mobile devices in a cell. The target mobile device 1404 can receive the broadcast channel signal and transmit an uplink signal to the base-station 1402. In some cases, the uplink signal can be transmitted by the target mobile device 1304 with known periodic properties in the time domain. For example, depending on the cellular network standard, the uplink signal can be aligned with slot, frame, training or pilot sequences, or a combination thereof. In some cases, e.g., if the cellular network is an LTE network, the uplink signal can be transmitted in a slot. In some cases, the target mobile device 1404 can adjust the transmission time of the uplink signal so that the uplink signal received at the base station 1402 is aligned with the broadcast channel transmitted by the base station 1402. For example, as shown in FIG. 14, the target mobile device 1404 can transmit the uplink signal at $\delta\tau_s$ ahead of the frame boundary of received broadcasting channel frame, e.g., frame1. In some instances, the uplink signal can be a RACH request.

In some implementations, the wireless sensor devices 1410 can passively monitor the signals transmitted in cellular networks that operate in any of multiple distinct cellular network standards. For example, the wireless sensor devices 1410 can monitor the cellular network signals without requesting services from the cellular network, and without sending data to the cellular network. In some instances, the wireless sensor devices 1410 can identify the wireless communication protocols and the uplink/downlink frequencies used by the cellular networks. The wireless sensor devices 1410 can receive both the broadcasting channel and the uplink signal. In some cases, one or more wireless sensor devices 1410 can determine that the uplink signal is transmitted with a predefined transmission pattern. The wireless sensor device 1410 can report the determination to the data analysis system. In some implementations, the data analysis system can send a command to the wireless sensor devices 1410 to calculate and report the time differences.

The wireless sensor devices 1410 can calculate the time differences between the broadcasting channel signal and the uplink signal, which are denoted as $\delta\tau_i$ in FIG. 14, where i is the index of the wireless sensor device 1410 and i=1, 2, 3 . . . n. The wireless sensor devices 1410 can also determine the location of the base station 1402. For example, the wireless sensor device 1410 can detect the unique identifier of the base station 1402 and determine its location from a publicly available database. The wireless sensor devices 1410 can send the time differences $\delta\tau_i$ to a data analysis system (e.g., the main controller 230 in FIG. 2). In some cases, the base-station 1402 can transmit $\delta\tau_s$, e.g., the timing advance value in an LTE network, in a downlink message to the target mobile device 1404. One or more wireless sensor devices 1410 can receive the downlink message and send $\delta\tau_s$ to the data analysis system as additional Time of Arrival measurement to improve the accuracy of location determination. In some cases, the wireless sensor devices 1410 can also send their own locations, the location of the base station, and a combination thereof to the data analysis system.

In some implementations, the data analysis system can form a system of non-linear equations based on the time differences $\delta\tau_i$ received from the wireless sensor devices 1410. For example, the locations of the wireless sensor devices 1410, the base-station 1402, and the target mobile device 1404 can be represented with the following vectors:

$$\vec{r}_s = (x_s, y_s, z_s)$$

$$\vec{r}_b = (x_b, y_b, z_b)$$

$$\vec{r}_i = (x_i, y_i, z_i)$$

The system of non-linear equations can include n equations based on the time differences $\delta\tau_i$. The following represents an example of the equations:

$$c\delta\tau_i = [|\vec{r}_s - \vec{r}_b| + |\vec{r}_s - \vec{r}_i|] - |\vec{r}_i - \vec{r}_b|,$$

where c is the speed of light

The data analysis system can then solve the system of non-linear equations and determine the location of the target mobile device 1404, i.e., $\vec{r}_s$. In some implementations, the location of the target mobile device 1404 can be determined based on arrival-time data generated by three or more wireless sensor devices 1410. The accuracy of the location determination can be improved with more data, e.g., arrival-time data from additional wireless sensor devices or more than one base-station.

In some implementations, the data analysis system can send a command to the wireless sensor devices 1410 in the sensor network. The command can instruct the wireless sensor devices 1410 to synchronize to a common timing synchronization source. The common synchronization source can be a base station that emits synchronization or broadcast channel, a Global Navigation Satellite System (GNSS) timing reference, a ground base transmitter that generates GNSS-compatible timing reference signals, any other broadcasted RF signals that carry precise timing reference, or any combination thereof. The data analysis system can instruct the wireless sensor devices 1410 to calculate the arrival time of the target signal, e.g., the uplink signal transmitted by the target mobile device 1404, against the common timing synchronization source. The wireless sensor devices 1410 can report the computed values to the data analysis system. The data analysis system can form a set of similar equations as discussed above based on the reported values and determine the location of the target mobile device 1404.

Figure 15:
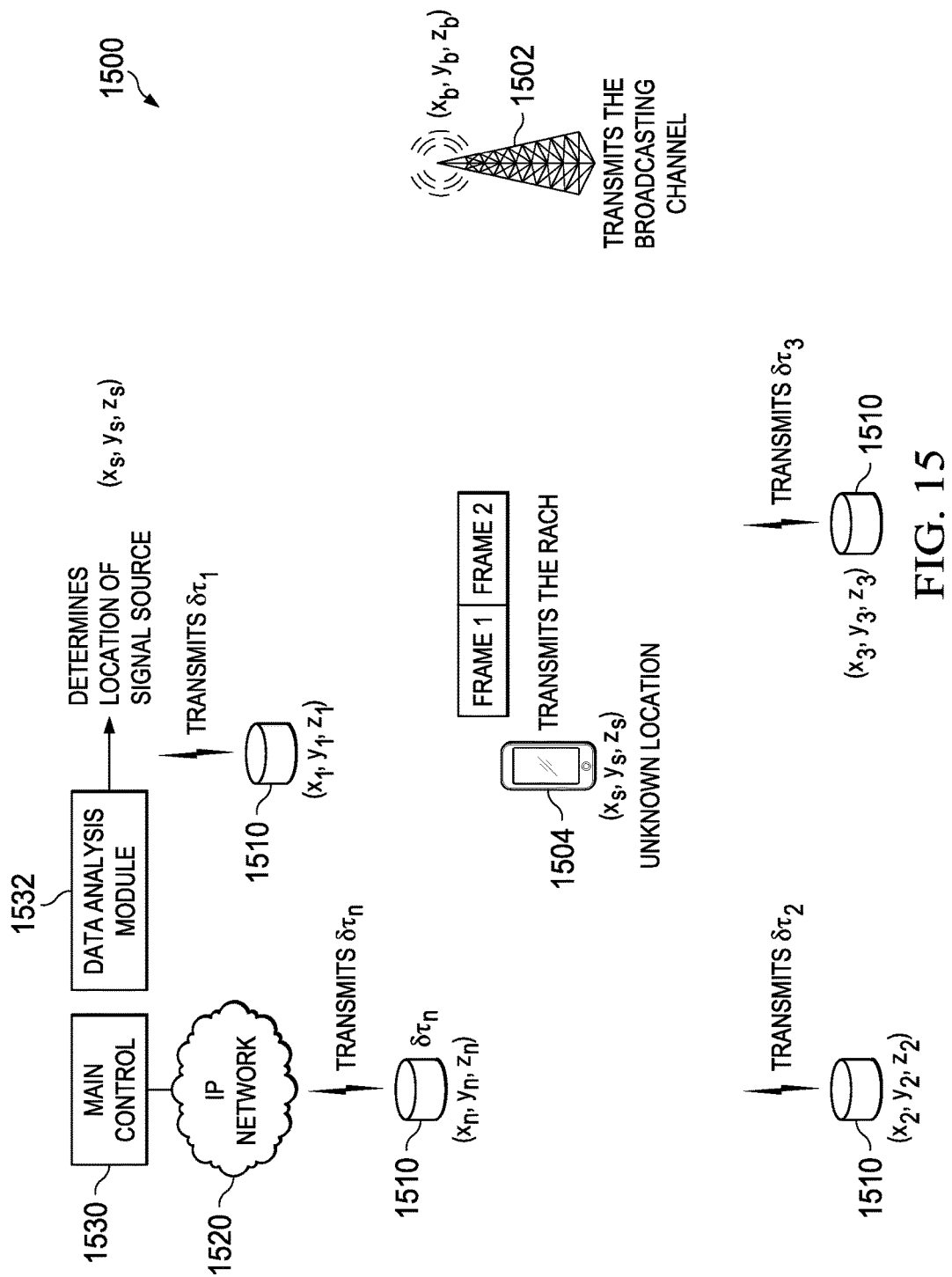
FIG. 15 is a block diagram showing an example wireless-signal source locator system.

FIG. 15 is a block diagram showing an example wireless-signal source locator system 1500. The wireless-signal source locator system 1500 can represent the wireless-spectrum analysis system 100 of FIG. 1, or another wireless-spectrum analysis system that can identify the locations of wireless-signal sources. The wireless-signal source locator system 1500 includes a number of wireless sensor devices 1510, an IP network 1520, a main controller 1530, and a data analysis module 1532. As illustrated, the wireless-signal source locator system 1500 also includes a base-station 1502 and a target mobile device 1504. The wireless-signal source locator system 1500 can include additional or different components. In some implementations, the wireless-signal source locator system can be arranged as shown in FIG. 15 or in another suitable manner.

As shown in FIG. 15, each wireless sensor device 1510 is located at a respective physical location having spatial coordinates $(x_i, y_i, z_i)$, where i varies from 1 to n. As discussed previously, each wireless sensor device 1510 can passively monitor the wireless signal transmitted by the base-station 1502 that is located at spatial coordinates $(x_b, y_b, z_b)$ and the target mobile device 1504 that is located at an unknown location $(x_s, y_s, z_s)$. The wireless sensor devices 1510 can calculate the time differences between the broadcasting channel signal transmitted by the base-station 1502 and the RACH signal transmitted by the target mobile device 1504, which are denoted as $\delta\tau_i$ in FIG. 15, where i is the index of the wireless sensor device 1510 and i=1, 2, 3 . . . n. The wireless sensor devices 1510 can transmit $\delta\tau_i$ to a data analysis system.

As shown in FIG. 15, the data analysis system can include a main controller 1530 and a data analysis module 1532. In some implementations, the wireless sensor devices 1510 can send the timing difference values $\delta\tau_i$ to the data analysis system through an IP network, e.g., the IP network 1520. In some implementations, the wireless sensor devices 1510 are connected to the IP network 1520 via a local network. In some implementations, some of the wireless sensor devices 1510 are connected directly to the IP network 1520 using one or more wide area networks.

The example main controller 1530 can be included in the data aggregation system 115 of FIG. 1 or another back-end system. The main controller 1530 can be a computing system that includes one or more computing devices or systems. The main controller 1530 or any of its components can be located at a data processing center, a computing facility, or another location. In the example shown, the main controller 1530 can remotely control operation of the wireless sensor devices 1510. Example functions of the main controller 1530 can include aggregating the information from some or all of the wireless sensor devices 1510, upgrading the software of the wireless sensor device 1510, and monitoring states of the wireless sensor devices 1510. For example, the main controller 1530 can send software updates to some or all wireless sensor devices 1510. In some implementations, as described previously, the main controller 1530 can send commands to instruct the wireless sensor devices 1510 to synchronize to a common timing synchronization source. The main controller 1530 can also instruct the wireless sensor devices 1510 to calculate the arrival time of the target signal against the common timing synchronization source.

In some implementations, the main controller 1530 can include or, as shown in FIG. 15, be coupled to a data analysis module 1532. The data analysis module 1532 can aggregate (e.g., assemble, compile, or otherwise manage) the timing difference values $\delta\tau_i$ from the multiple wireless sensor devices 1510 and determine the location of the target mobile device 1504. In some implementations, the data analysis module 1532 can analyze real-time data, historical data, or a combination of both, and determine locations for a geographic region.

In the examples shown in FIGS. 13, 14 and 15, the wireless sensor devices (1310, 1410, 1510) are distributed at distinct locations over the geographic region, and the wireless sensor devices passively monitor wireless communication network signals in the geographic region. The example wireless communication network signals shown in FIGS. 13, 14 and 15 are the signals generated by the mobile device (1304, 1404, 1504) and the base station (1302, 1402, 1502), which are formatted according to a cellular network standard (e.g., 3G, LTE, etc.); but wireless sensor devices can monitor other types of wireless communication network signals. For example, the wireless sensor devices may monitor signals formatted according to another type of wireless communication network protocol (e.g., WiFi, Bluetooth, etc.).

Each wireless sensor device (1310, 1410, 1510) is configured to receive a device signal from a mobile device in the geographic region. In the examples shown in FIGS. 13, 14 and 15, the device signal can be the RACH signal, the uplink signal, or another signal that is generated by the mobile device (1304, 1404, 1504) for transmission to the base station. Each wireless sensor device (1310, 1410, 1510) is also configured to receive a reference signal from a synchronization source. In the examples shown in FIGS. 13, 14 and 15, the reference signal can be the broadcasting channel or another signal transmitted by the base station (1302, 1402, 1502). In some cases, the reference signal can be received from another type of synchronization source. For example, the reference signal can be received from the main control 1530, from a satellite system, etc.

These and other types of device signals and references signals may be detected and used by the wireless sensor devices to generate arrival-time data. In the examples shown in FIGS. 13, 14 and 15, the arrival time data include the time differences $\delta\tau_i$ computed by each of the respective wireless sensor devices. The time differences, or other types of arrival-time data, may be generated by the wireless sensor devices and used (e.g., by a data analysis system) to identify the location of the mobile device. For example, the wireless sensor devices may transmit the arrival-time data to the data analysis module 1532, and the data analysis module 1532 can identify a location of the mobile device based on analyzing the arrival-time data generated by three or more of the wireless sensor devices.

Figure 16:
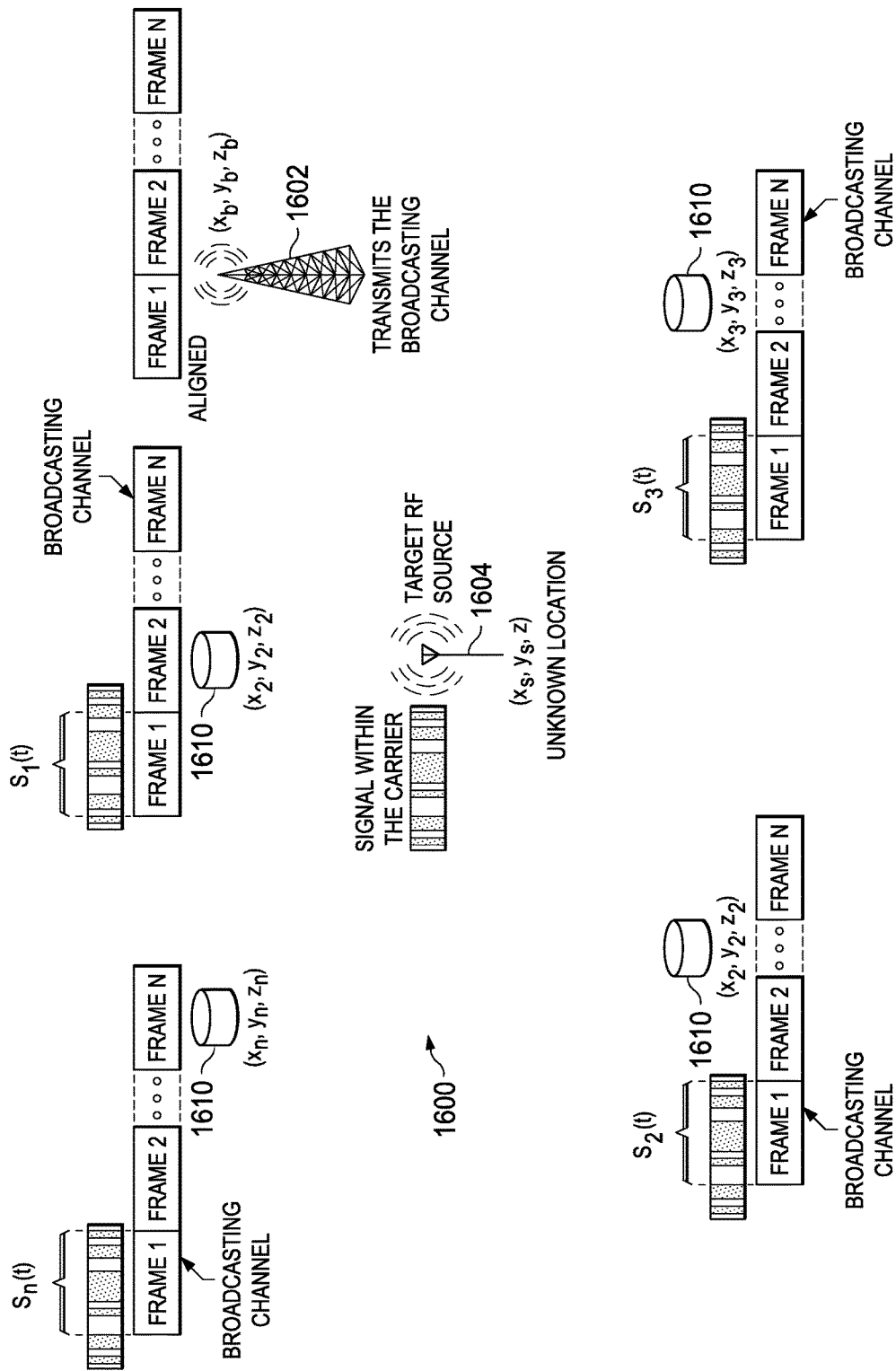
FIG. 16 is a block diagram showing an example technique to identify the location of an RF source.

FIG. 16 is a block diagram 1600 showing an example technique for identifying the location of an RF source without prior knowledge of the transmit signal structure. As shown in FIG. 16, the block diagram 1600 includes several wireless sensor devices 1610 that are located at positions having spatial coordinates $(x_1, y_1, z_1)$, $(x_2, y_2, z_2)$, $(x_3, y_3, z_3)$, and $(x_n, y_n, z_n)$, where n is the n-th sensor device in a sensor network. The block diagram 1600 also includes a base-station 1602 located at $(x_b, y_b, z_b)$ and a target RF source 1604 at an unknown location that has spatial coordinates $(x_s, y_s, z_s)$. In some implementations, the wireless sensor devices 1610 can determine the location of the base-station 1602. For example, one or more wireless sensor device 1610 can detect the unique identifier of the base-station 1602 and determine the location of the base-station 1602 from a publicly available database. In some implementations, the wireless sensor devices 1610 can synchronize to the broadcasting channel signal transmitted by the base-station 1602. Alternatively or in combination, the wireless sensor devices 1610 can synchronize to any other common synchronization source, e.g., GNSS/GPS signal.

In some implementations, the wireless sensor devices 1610 can detect an RF signal with unknown structure transmitted by the target RF source 1604. The wireless sensor devices 1610 can report the detection to a data analysis system. In some cases, the data analysis system can request the wireless sensor devices 1610 to report synchronization source and current time references. The data analysis system can determine a start time and an end time of signal recording according to the common synchronization source, e.g., the GNSS time or the cellular network frame number. In some cases, the data analysis system can provide the start time and the end time to the wireless sensor devices 1610 before the signal recording starts. At start time, all the wireless sensor devices 1610 can begin to record the signals from the target RF source 1604. In the illustrated example, the start time is the beginning of frame1 of the base station's broadcasting channel signal that the wireless sensor devices 1610 receive, for a case where the base station's broadcasting channel signal is used as the common synchronization source.

After recording, the wireless sensor devices 1610 can store the recorded waveform, denoted as $S_i(t)$, where i is the index of the wireless sensor device 1610 and i=1, 2, 3 . . . n. The wireless sensor devices 1610 can send the raw $S_i(t)$ waveforms to the data analysis system.

The data analysis system can receive the recorded waveforms and determine the time each is shifted relative to another. In some implementations, the data analysis system can apply a correlation function between $S_i(t)$ and $S_j(t)$, where i and i are indices of each pair of the wireless sensor device 1610 and i≠j. The following terms represent examples of the cross correlations of the recorded signals.

$$(S_1 * S_2)(\tau)$$

$$(S_1 * S_3)(\tau)$$

$$(S_2 * S_3)(\tau)$$

where $\tau$ indicates the time of the cross correlation. The cross correlations can produce outputs with various peaks. In some cases, e.g., if there is no multi-path scattering, one peak can be produced. In some cases, e.g., if there are several multi-path, multiple peaks can be produced.

Figure 18:
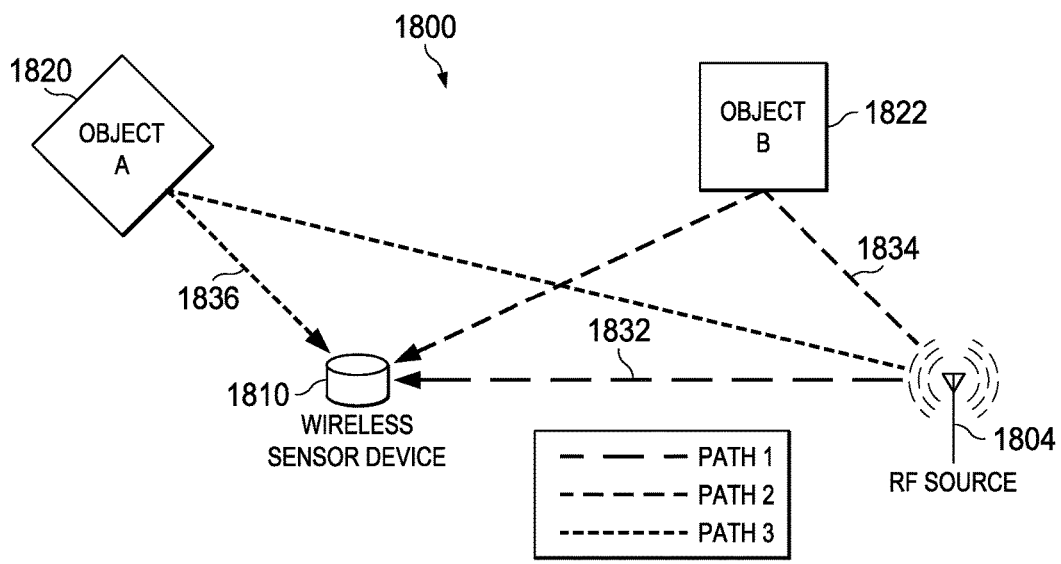
FIG. 18 is a block diagram showing multiple paths of a signal.
Figure 19:
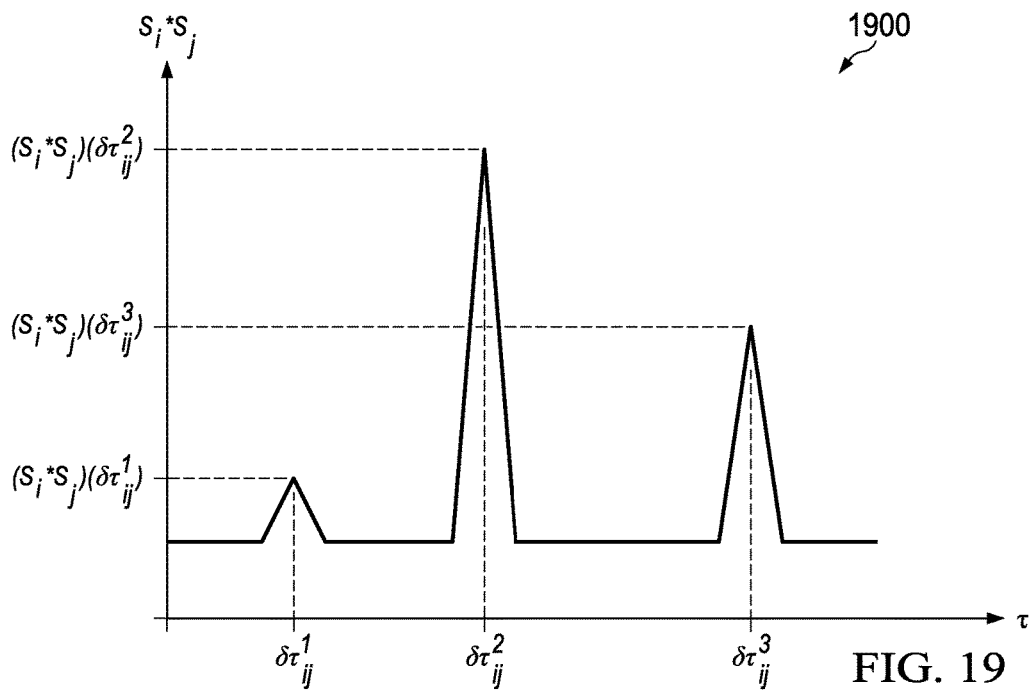
FIG. 19 is a chart showing multiple cross-correlation peaks as a result of the multi-path effect.

FIGS. 18 and 19 illustrate examples of multi-path effects. FIG. 18 is a block diagram 1800 showing multiple paths of a signal. The block diagram 1800 includes an RF source 1804 that transmits an RF signal, a wireless sensor device 1810 that receives the RF signal transmitted by the RF source 1804. The block diagram 1800 also includes object A 1820 and object B 1822, which reflect the RF signal. The RF source can be a base station, a mobile device, or another type of RF source. As shown in FIG. 18, the RF signal can take "path 1" 1832 and travel directly from the RF source 1804 to the wireless sensor device 1810. The RF signal can also travel from the RF source 1804 to the wireless sensor device 1810 via "path 2" 1834 and "path 3" 1836, which reflects off the object B 1822 and the object A 1820, respectively.

FIG. 19 is a chart 1900 showing multiple cross-correlation peaks as a result of the multi-path effect. As shown in FIG. 19, multiple peaks, corresponding to arrival time $\delta\tau_{ij}^1$, $\delta\tau_{ij}^2$, and $\delta\tau_{ij}^3$ can be identified based on the correlation calculations. In some implementations, one peak is identified. The identified peak can correspond to the first detected signal path, which can represent the shortest path. The identified peak can also correspond to the strongest signal path, which can represent a higher confidence. In some cases, all paths can be selected, which can result multiple $\vec{r}_s$ values.

Returning to FIG. 16, in the illustrated example, one peak that corresponds to an arrival time $\delta\tau_{ij}$ can be identified. The data analysis system can form a system of non-linear equations based on $\delta\tau_{ij}$. For example, the locations of the wireless sensor devices 1610, the base-station 1602, and the target RF source 1604 can be represented with the following vectors:

$$\vec{r}_s = (x_s, y_s, z_s)$$

$$\vec{r}_s = (x_b, y_b, z_b)$$

The system of non-linear equations can include n equations. The following represents an example of the equations:

$$c\delta\tau_{ij} = [|\vec{r}_b - \vec{r}_i| + |\vec{r}_s - \vec{r}_i|] - [|\vec{r}_b - \vec{r}_j| + |\vec{r}_s - \vec{r}_j|]$$

where c is the speed of light

The data analysis system can then solve the system of non-linear equations and determine the location of the target RF source 1604, i.e., $\vec{r}_s$. In some implementations, the location of the target RF source 1604 can be determined based on recorded waveforms generated by three wireless sensor devices 1310. The accuracy of the location determination can be improved with more data, e.g., recorded waveforms from additional wireless sensor devices.

Figure 17:
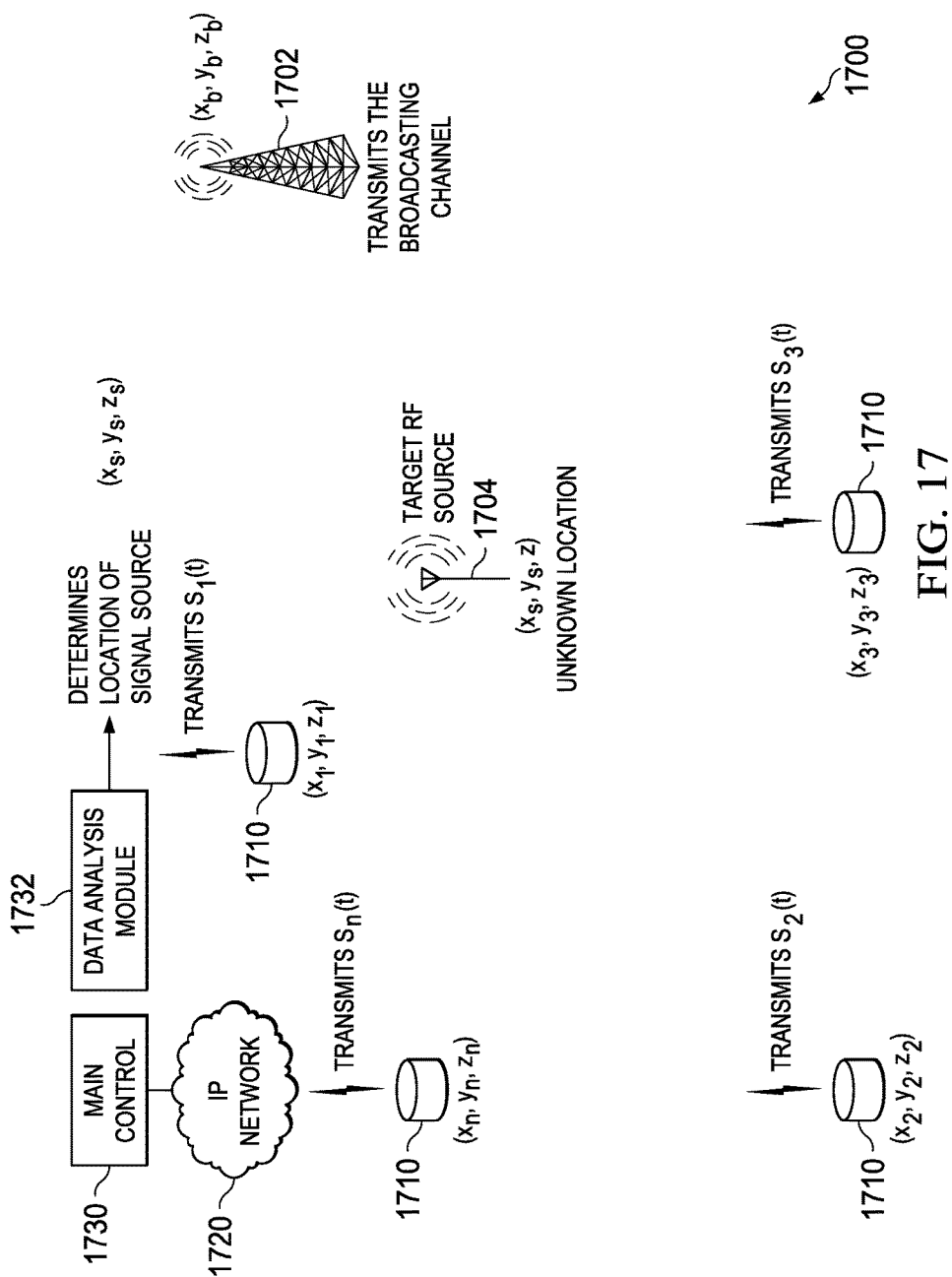
FIG. 17 is a block diagram showing an example wireless-signal source locator system.

FIG. 17 is a block diagram showing an example wireless-signal source locator system 1700. The example wireless-signal source locator system 1700 can represent the wireless-spectrum analysis system 100 of FIG. 1, or another wireless-spectrum system. The wireless-signal source locator system 1700 includes a number of wireless sensor devices 1710, an IP network 1720, a main controller 1730, and a data analysis module 1732. As illustrated, the wireless-signal source locator system 1700 also includes a base-station 1702 and a target RF source 1704. The wireless-signal source locator system 1700 can include additional or different components. In some implementations, the wireless-signal source locator system can be arranged as shown in FIG. 17 or in another suitable manner.

As shown in FIG. 17, each wireless sensor device 1710 is located at a respective physical location having spatial coordinates $(x_i, y_i, z_i)$, where i varies from 1 to n. As discussed previously, each wireless sensor device 1710 can passively monitor the wireless signal transmitted by the base-station 1702 that is located at spatial coordinates $(x_b, y_b, z_b)$ and the target RF source 1704 that is located at an unknown location $(x_s, y_s, z_s)$. As described previously, the wireless sensor devices 1710 can synchronize to the broadcasting channel signal transmitted by the base-station 1702. The wireless sensor devices 1710 can also record the waveform of the RF signal transmitted by the target RF source 1704, denoted as $S_i(t)$, where i is the index of the wireless sensor device 1710 and i=1, 2, 3 . . . n. The wireless sensor devices 1510 can transmit $S_i(t)$ to a data analysis system.

As shown in FIG. 17, the data analysis system can include a main controller 1730 and a data analysis module 1732. In some implementations, the wireless sensor devices 1710 can send $S_i(t)$ to the data analysis system through an IP network, e.g., the IP network 1720.

The example main controller 1730 can be included in the data aggregation system 115 of FIG. 1 or another back-end system. The main controller 1730 can be a computing system that includes one or more computing devices or systems. The main controller 1730 or any of its components can be located at a data processing center, a computing facility, or another location. In the example shown, the main controller 1730 can remotely control operation of the wireless sensor devices 1710. Example functions of the main controller 1730 can include aggregating the information from some or all of the wireless sensor devices 1710, upgrading the software of the wireless sensor device 1710, and monitoring states of the wireless sensor devices 1710. In some implementations, as described previously, the main controller 1730 can send commands to instruct the wireless sensor devices 1710 to synchronize to a common timing synchronization source. The main controller 1730 can also indicate the start and end time of signal recording to the wireless sensor devices 1710.

In some implementations, the main controller 1730 can include or, as shown in FIG. 17, be coupled to a data analysis module 1732. The data analysis module 1732 can perform cross-correlation of the recorded waveforms and identify arrival-time information based on the identified peaks. The data analysis module 1732 can determine the location of the target RF source 1704 based on the arrival time information. In some implementations, the data analysis module 1732 can analyze real-time data, historical data, or a combination of both, and determine locations for a geographic region.

Figure 20:
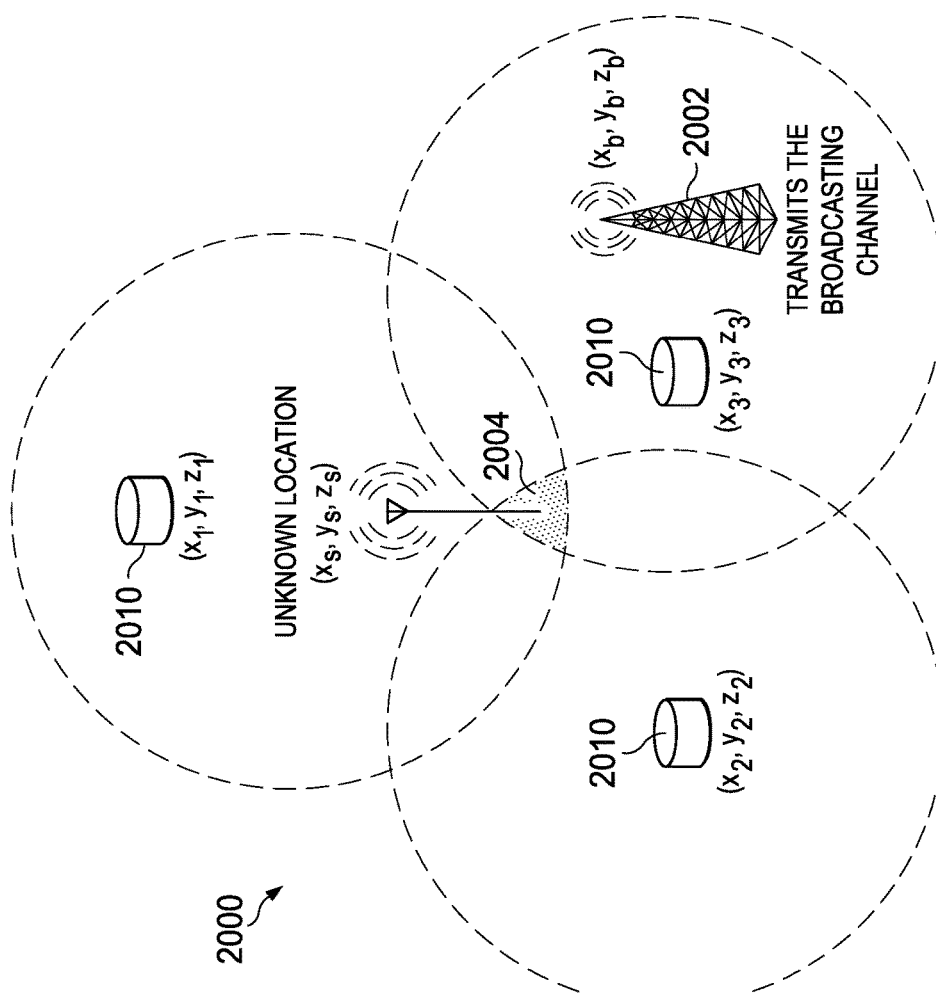
FIG. 20 is a block diagram showing an example distribution of wireless sensor devices in multiple cells.

FIG. 20 is a block diagram 2000 showing an example distribution of wireless sensor devices in multiple cells. As shown in FIG. 20, the block diagram 2000 includes several wireless sensor devices 2010 that are located at positions having spatial coordinates $(x_1, y_1, z_1)$, $(x_2, y_2, z_2)$, and $(x_3, y_3, z_3)$. The block diagram 2000 also includes a base-station 2002 located at $(x_b, y_b, z_b)$ and a target RF source 2004 at an unknown location of $(x_s, y_s, z_s)$. The wireless sensor devices 2010 can be located in different cells. In the illustrated example, one of the wireless sensor devices 2010 is located in the same cell as the base-station 2002, while the other wireless sensor devices 2010 are located in different cells. In some cases, the wireless sensor devices 2010 that are located at different cells can work together in determining the location of the target RF source 2004. For example, these wireless sensor devices 2010 can calculate timing differences based on the target signal transmitted by the target RF source 2004, or record received waveforms of the target RF source 2004. These wireless sensor devices 2010 can send the data to the data analysis system to determine the location of the target RF source 2004.

In some implementations, the wireless sensor devices 2010 can use the signals transmitted in other cells as a common synchronization source. For example, some or all of the wireless sensor devices 2010 in FIG. 20 can use the broadcasting channel signal transmitted by the base-station 2002 as the common synchronization source. In some cases, the wireless sensor devices 2010 can use other sources, e.g., GNSS/GPS signal, as the common synchronization source.

Figure 21:
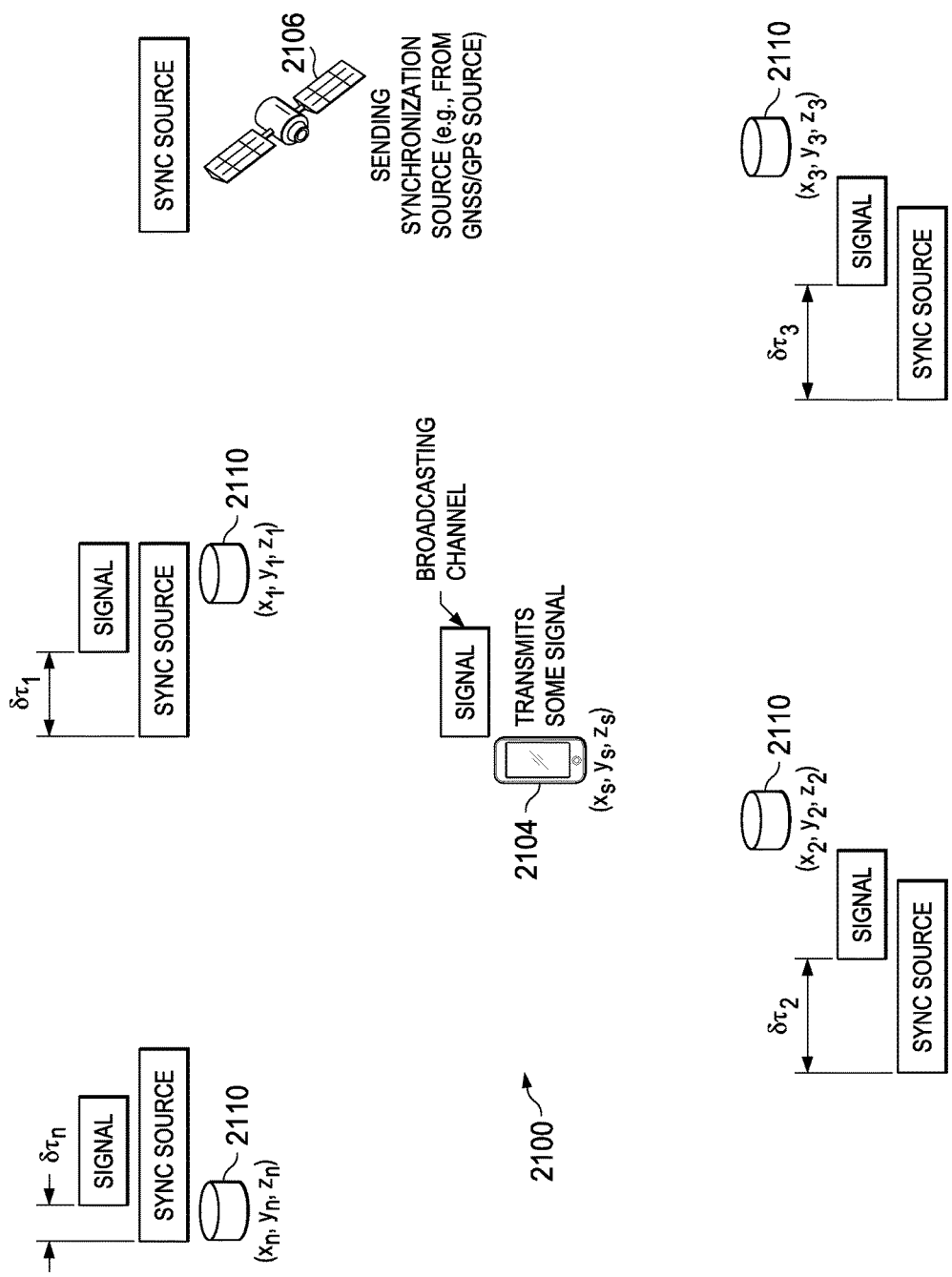
FIG. 21 is a block diagram showing an example synchronization source based on a satellite signal.

FIG. 21 is a block diagram 2100 showing an example common synchronization source based on a satellite signal. As shown in FIG. 21, the block diagram 2100 includes several wireless sensor devices 2110 that are located at positions having spatial coordinates $(x_1, y_1, z_1)$, $(x_2, y_2, z_2)$, $(x_3, y_3, z_3)$, and $(r_n, y_n, z_n)$, where n is the n-th sensor device in a sensor network. The block diagram 2100 also includes a satellite 2106 and a target RF source 2104 at an unknown location of $(x_s, y_s, z_s)$. In some implementations, as described previously, a common synchronization source can provide a synchronization signal for the wireless sensor devices 2110 in locating the target RF source 2104. In some cases, the synchronization signal can be a signal transmitted by a base-station, e.g., synchronization or broadcast channel. In some cases, the synchronization signal can be any other broadcasted RF signals that carry precise timing reference. In some cases, as shown in FIG. 21, the synchronization signal can be a signal that is transmitted by the satellite 2106. For example, the synchronization signal can be a GNSS signal or a GPS signal.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of examples have been described. Nevertheless, it will be understood that various modifications can be made. Accordingly, other embodiments are within the scope of the following claims.

The invention claimed is:

1. A method of determining a location of a wireless source, the method comprising:
    sending a synchronization signal to wireless sensor devices distributed at distinct locations over a geographic region, the wireless sensor devices configured to passively monitor wireless signals in the geographic region;
    receiving wireless source signals collected by the wireless sensor devices after receiving the synchronization signal, each wireless source signal comprising a radio-frequency (RF) transmission from a wireless source in the geographic region, each wireless source signal detected by a respective wireless sensor device at a time indicated by the synchronization signal; and
    identifying, at a data analysis system, a location of a wireless source in the geographic region based on cross-correlating the wireless source signals collected by three or more distinct wireless sensor devices, wherein identifying the location of the wireless source in the geographic region is based on solving a system of equations, the system of equations comprising n equations:

$$c\delta\tau_{ij} = [|\vec{r}_b - \vec{r}_i| + |\vec{r}_s - \vec{r}_i|] - [|\vec{r}_b - \vec{r}_j| + |\vec{r}_s - \vec{r}_j|]$$

where $\vec{r}_s = (x_s, y_s, z_s)$ represents the location of the wireless source, $\vec{r}_b = (x_b, y_b, z_b)$ represents a location of a base station, $\vec{r}_i = (x_i, y_i, z_i)$ represents a location of the i-th wireless sensor device, $\vec{r}_j = (x_j, y_j, z_j)$ represents a location of the j-th wireless sensor device, c represents the speed of light, and $\delta\tau_{ij}$ represents a peak identified in a cross-correlation output.

2. The method of claim 1, wherein the synchronization signal indicates a synchronized start time when the wireless sensor devices begin recording the wireless source signals.

3. The method of claim 1, comprising identifying the location of the wireless source in the geographic region by:
    cross-correlating respective pairs of the wireless source signals;
    identifying one or more peaks in each of the cross-correlation outputs;
    identifying arrival-time information based on the one or more peaks; and
    identifying the location based on the arrival-time information.

4. The method of claim 2, wherein the synchronization signal indicates a synchronized end time when the wireless sensor devices finish recording the wireless source signals.

5. The method of claim 3, wherein cross-correlating respective pairs of the wireless source signals comprises applying a correlation function between $S_i(t)$ and $S_j(t)$, where $S_n(t)$ represents the wireless source signal waveform received from an n-th wireless sensor device, i and j are indices of the respective wireless sensor device, and $i \neq j$.

6. The method of claim 1, wherein each wireless sensor device is a wireless spectrum-inspection device.

7. The method of claim 1, wherein the wireless sensor devices are configured to passively monitor cellular network signals formatted according to any of multiple distinct cellular network standards.

8. The method of claim 1, wherein passively monitoring wireless signals in the geographic region comprises monitoring wireless signals exchanged in a wireless communication network without requesting services from the wireless communication network.

9. The method of claim 1, wherein each wireless sensor device comprises:
    an RF interface configured to detect RF signals in a local wireless environment about the wireless sensor device;
    a signal analysis subsystem configured to process the RF signals; and
    a communication interface configured to transmit data to a remote system.

10. A wireless-signal source locator system comprising:
    wireless sensor devices distributed at distinct locations over a geographic region and configured to passively monitor wireless communication network signals in the geographic region, each wireless sensor device configured to:
        receive a synchronization signal;
        detect, at a time indicated by the synchronization signal, a wireless source signal comprising a radio-frequency (RF) transmission from a wireless source in the geographic region; and transmit the wireless source signal; and a data analysis system comprising one or more processors configured to identify a location of the wireless source based on cross-correlating the wireless source signals transmitted by three or more distinct wireless sensor devices, wherein identifying the location of the wireless source in the geographic region is based on solving a system of equations, the system of equations comprising n equations:

$$c\delta\tau_{ij}=[|\vec{r}_b-\vec{r}_i|+|\vec{r}_s-\vec{r}_i|]-[|\vec{r}_b-\vec{r}_j|+|\vec{r}_s-\vec{r}_j|]$$

where $\vec{r}_s=(x_s, y_s, z_s)$ represents the location of the wireless source, $\vec{r}_b=(x_b, y_b, z_b)$ represents a location of a base station, $\vec{r}_i=(x_i, y_i, z_i)$ represents a location of the i-th wireless sensor device, $\vec{r}_j=(x_j, y_j, z_j)$ represents a location of the j-th wireless sensor device, c represents the speed of light, and $\delta\tau_{ij}$ represents a peak identified in a cross-correlation output.

11. The system of claim 10, wherein the synchronization signal indicates a synchronized start time when the wireless sensor devices begin recording the wireless source signals.

12. The system of claim 11, wherein the synchronization signal indicates a synchronized end time when the wireless sensor devices finish recording the wireless source signals.

13. The system of claim 10, wherein the data analysis system is configured to identify the location of the wireless source in the geographic region by:

cross-correlating respective pairs of the wireless source signals;

identifying one or more peaks in each of the cross-correlation outputs;

identifying arrival-time information based on the one or more peaks; and identifying the location based on the arrival-time information.

14. The system of claim 13, wherein cross-correlating respective pairs of the wireless source signals comprises applying a correlation function between $S_i(t)$ and $S_j(t)$, where $S_n(t)$ represents the wireless source signal waveform received from an n-th wireless sensor device, i and j are indices of the respective wireless sensor device, and $i \neq j$.

15. The system of claim 10, wherein each wireless sensor device is a wireless spectrum-inspection device.

16. The system of claim 10, wherein the wireless sensor devices are configured to passively monitor cellular network signals formatted according to any of multiple distinct cellular network standards.

17. The system of claim 10, wherein passively monitoring wireless signals in the geographic region comprises monitoring wireless signals exchanged in a wireless communication network without requesting services from the wireless communication network.

18. The system of claim 10, wherein each wireless sensor device comprises:

an RF interface configured to detect RF signals in a local wireless environment about the wireless sensor device;

a signal analysis subsystem configured to process the RF signals; and a communication interface configured to transmit data to a remote system.

\* \* \* \* \*